US012524003B2

(12) United States Patent
Elliott et al.

(10) Patent No.: US 12,524,003 B2
(45) Date of Patent: *Jan. 13, 2026

(54) TASK MANAGEMENT FOR ROBOTIC SYSTEMS AND APPLICATIONS

(71) Applicant: NVIDIA Corporation, Santa Clara, CA (US)

(72) Inventors: David Elliott, San Jose, CA (US); Gordon Grigor, San Francisco, CA (US)

(73) Assignee: NVIDIA Corporation, Santa Clara, CA (US)

( * ) Notice: Subject to any disclaimer, the term of this patent is extended or adjusted under 35 U.S.C. 154(b) by 310 days.

This patent is subject to a terminal disclaimer.

(21) Appl. No.: 18/341,447

(22) Filed: Jun. 26, 2023

(65) Prior Publication Data

US 2024/0427325 A1    Dec. 26, 2024

(51) Int. Cl.
*G05D 1/00* (2024.01)
*B60W 60/00* (2020.01)
*G06N 3/08* (2023.01)

(52) U.S. Cl.
CPC .......... *G05D 1/0027* (2013.01); *B60W 60/00* (2020.02); *G05D 1/0022* (2013.01); *G06N 3/08* (2013.01); *B60W 2556/45* (2020.02)

(58) Field of Classification Search
CPC .............. G05D 1/0027; G05D 1/0022; B60W 60/00; B60W 2556/45; B60W 60/0011; G06N 3/08; G06N 3/006
See application file for complete search history.

(56) References Cited

U.S. PATENT DOCUMENTS 10,885,698 B2    1/2021   Muthler et al.
2011/0135189 A1*  6/2011   Lee ...................... G05D 1/0027
                                                          901/1

(Continued)

FOREIGN PATENT DOCUMENTS

CN          112235419 A      1/2021

OTHER PUBLICATIONS

"Behavior Tree Artificial Intelligence, robotics and control", Wikipedia, Retrieved from Internet URL : https://en.wikipedia.org/wiki/Behavior_tree_(artificial_intelligence,_robotics_and_control), accessed on May 11, 2023, 5 pages.

(Continued)

*Primary Examiner* — Anne Marie Antonucci
*Assistant Examiner* — Patrick Daniel Mohl
(74) *Attorney, Agent, or Firm* — Shook, Hardy & Bacon L.L.P.

(57)    ABSTRACT

In various examples, behavior-based mission task management for mobile autonomous machine systems and applications are provided. A mission controller may generate a mission behavior model logic framework for a mission that accounts for the actions of a set of multiple task agents that play a role in completing the mission. The mission controller may assemble a framework starting from a baseline task sequence, correlate tasks defined by the baseline task sequence with pre-defined behavior models, and customize those behavior models based on mission task customization parameters. The mission controller may provide the mission behavior model logic framework to a mission dispatch function. Individual autonomous mobile task agents may then proceed to execute their assigned portions of local task sequences in accordance with the customized behavior models distributed to them by the mission dispatch function.

20 Claims, 15 Drawing Sheets

(56) References Cited

U.S. PATENT DOCUMENTS

| | | | |
|---|---|---|---|
| 2012/0010772 A1* | 1/2012 | Pack | B25J 9/1664 |
| | | | 701/27 |
| 2014/0111332 A1* | 4/2014 | Przybylko | G06Q 10/00 |
| | | | 340/573.6 |
| 2021/0018912 A1* | 1/2021 | Dymesich | G06F 3/0482 |
| 2021/0188430 A1* | 6/2021 | Kisiler | G05D 1/69 |
| 2021/0325862 A1* | 10/2021 | Buerger | G05B 19/41895 |
| 2022/0011779 A1* | 1/2022 | Kim | G06T 7/277 |
| 2022/0035372 A1* | 2/2022 | Saunders | G05D 1/0088 |
| 2022/0197306 A1* | 6/2022 | Cella | G06N 20/00 |
| 2023/0071115 A1* | 3/2023 | Matsuoka | G06N 3/08 |
| 2024/0005641 A1* | 1/2024 | Bhatia | G06T 3/40 |
| 2024/0111571 A1* | 4/2024 | Lian | B25J 9/1661 |
| 2024/0118689 A1* | 4/2024 | Jobanputra | G05D 1/0022 |
| 2024/0425075 A1* | 12/2024 | Elliott | G06N 3/08 |

OTHER PUBLICATIONS

Castro, S., "Introduction to Behavior Trees", Robohub, Retrieved from Internet URL : https://robohub.org/introduction-to-behavior-trees/, accessed on May 11, 2023, pp. 1-17 (Aug. 17, 2021).

Colledanchise, M., and Ögren, P., "Behavior Trees in Robotics and AI", An Introduction, arXiv:1709.00084v6, pp. 198 (Oct. 25, 2022).

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, pp. 1-35 (Jun. 15, 2018).

ISO 26262, "Road vehicle—Functional safety," International standard for functional safety of electronic system, Retrieved from Internet URL: https://en.wikipedia.org/wiki/ISO_26262, accessed on Sep. 13, 2021, 8 pages.

IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pages.

Non-Final Office Action received for U.S. Appl. No. 18/341,432, mailed on May 19, 2025, 18 pages.

Final Office Action received for U.S. Appl. No. 18/341,432, mailed on Oct. 16, 2025, 20 pages.

* cited by examiner

TASK MANAGEMENT FOR ROBOTIC SYSTEMS AND APPLICATIONS

CROSS-REFERENCE TO RELATED APPLICATIONS

This application is related to U.S. patent application Ser. No. 18/341,432 titled "AUTONOMOUS MACHINE MANAGEMENT USING BEHAVIOR-BASED MISSION TEMPLATES" filed on Jun. 26, 2023, which is hereby incorporated by reference in its entirety.

BACKGROUND

Businesses looking to improve operational efficiency are increasingly turning to robotics and/or other autonomous mobile systems—such as autonomous mobile robots (AMRs) and/or autonomous guided vehicles (AGVs)—to perform tasks previously performed by humans. Autonomous mobile systems, for example, may be designed to self-navigate through a facility while performing assigned tasks, such as delivering tools, packages and/or supplies, relocating inventory, performing mechanical tasks (e.g., operating other machinery, tools, or equipment), cleaning, assisting human personnel, and/or other functions.

SUMMARY

Embodiments of the present disclosure relate to behavior-based dynamic mission task sequence assembly for mobile autonomous machine systems and applications. Systems and methods are disclosed that generate an overall mission framework that defines synchronized task sequences for multiple task agents. In some embodiments, the mission framework may be used to control one or more of the multiple task agents to complete a mission by distributing segments of the mission framework performed by the individual respective task agents to those respective task agents.

In contrast to traditional systems for controlling autonomous machines, the systems and methods presented in this disclosure may provide, among other things, a mission controller that generates a framework, referred to herein as a mission behavior model logic framework, for an overall mission that accounts for the actions of a set of multiple task agents that play a role in completing the overall mission. The mission controller may assemble a mission behavior model logic framework starting from a baseline task sequence. The baseline task sequence may include behavior models that represent actions taken by task agents during the performance of a mission. The mission controller breaks down a mission into a series of behavior-based sequences that represent tasks performed by each of the task agents. Behavior-based sequences may include synchronization points to coordinate the behaviors of individual task agents.

In one or more embodiments, the mission controller may receive a mission request that includes information defining a primary task to be performed by an autonomous system. The mission controller may parse and/or infer primary task details from the mission request, such as a primary task classification and/or one or more mission task customization parameters. The mission controller may correlate the primary task indicated by a mission request to mission templates available from a mission template library. A mission template may specify a baseline task sequence (e.g., a high-level representation of a local task sequence) that when performed is expected to result in the plurality of task agents completing the primary task requested by the mission request. Once the mission controller selects a mission template for the requested mission, the mission controller may proceed with assembling a mission behavior model logic framework for a mission instance by correlating tasks defined by the mission template with predefined behavior models, and customizing those behavior models based on mission task customization parameters. In some embodiments, behavior models may be obtained from a task library. For each behavior model retrieved from the task library, the mission controller may customize the behavior model based on the mission task customization parameters to generate custom behavior models specific to the given mission request. In some embodiments, to implement a mission instance, the mission controller may push, or otherwise provide, the mission behavior model logic framework, or one or more segments thereof, to a mission dispatch function. The individual autonomous mobile task agents may then proceed to execute their assigned portions of local task sequences in accordance with the customized behavior models distributed to them by the mission dispatch function.

BRIEF DESCRIPTION OF THE DRAWINGS

The present systems and methods for behavior-based dynamic mission task sequence assembly for mobile autonomous machines are described in detail below with reference to the attached drawing figures, wherein.

DETAILED DESCRIPTION

Figure 1:
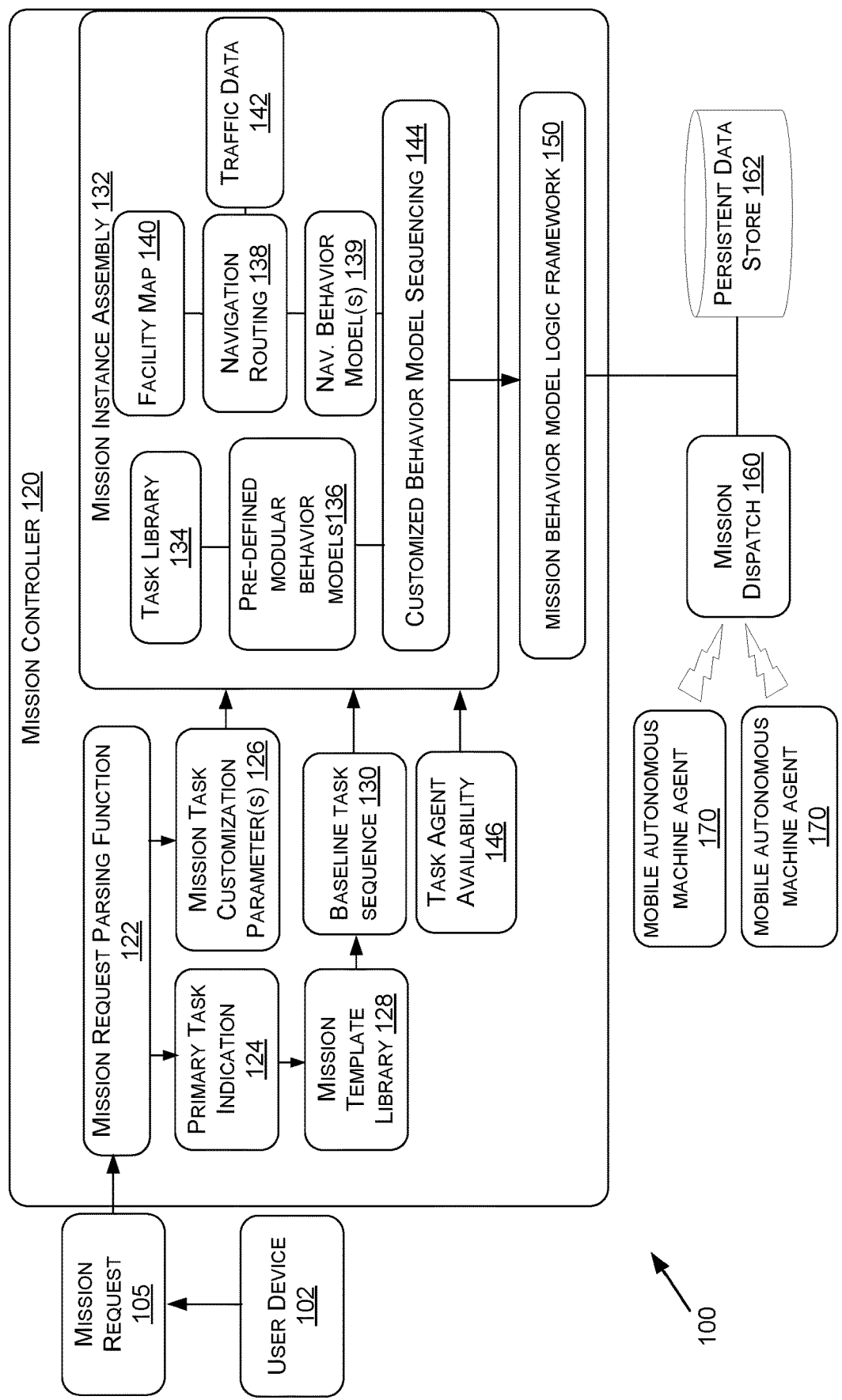
FIG. 1 is a data flow diagram for a behavior-based mission task management system, in accordance with some embodiments of the present disclosure.

Systems and methods are disclosed related to behavior-based dynamic mission task sequence assembly for mobile autonomous machines. Although the present disclosure may be described with respect to example robotics and autonomous mobile systems, this is not intended to be limiting. For example, the systems and methods described herein may be used by, without limitation, non-autonomous vehicles or machines, semi-autonomous vehicles or machines (e.g., in one or more advanced driver assistance systems (ADAS)), autonomous vehicles or machines (such as autonomous or semi-autonomous vehicle or machine 600—alternatively referred to herein as "vehicle 600" or "ego-machine 600,"—an example of which is described with respect to FIGS. 6A-6D), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. In addition, although the present disclosure may be described with respect to operating autonomous mobile systems, this is not intended to be limiting, and the systems and methods described herein may be used in augmented reality, virtual reality, mixed reality, robotics, security and surveillance, autonomous or semi-autonomous machine applications, and/or any other technology spaces where managing task sequences of automated systems may be used.

The present disclosure relates to managing operations of autonomous mobile systems to complete complex missions that involve multiple tasks performed by multiple task agents. More specifically, the systems and methods presented in this disclosure provide for technologies that generate an overall mission framework that defines synchronized task sequences for multiple task agents. In some embodiments, the mission framework may be used to control one or more of the multiple task agents to complete the mission by distributing segments of the mission framework performed by the individual respective task agents to those respective task agents.

In traditional robotic systems, each navigational and/or mechanical action performed by a robot is typically implemented using pre-planned incremental sets of instructions. These traditional robotic systems are limited in their ability to implement contingency actions when external factors did not precisely align with expectations and assumptions at the time instructions for the robot were compiled (e.g., a delay caused by addressing an obstruction in the path of the robot). In addition, these pre-computed or pre-planned sets of instructions do not account for navigating through heavily trafficked or crowded spaces, or for avoiding such spaces, and thus may result in a robot entering crowded spaces, navigating slowly or stopping navigation, or aborting a mission.

Finite State Machines (FSMs), such as Hierarchical Finite State Machines (HFSMs), represent technologies developed to allow a robot to switch between states that comprise different programming instructions, in response to inputs that indicate a change in circumstances. However, FSM-based systems face challenges with respect to scalability. When a robot needs to operate in a complex dynamic environment involving actions by other agents, the modeling of the system results in FSMs and HFSMs that may contain large numbers of transitions and consequently may need to define correspondingly large number of states, making such models impractical to implement within the context of processing resources available on-board an automated machine.

Behavior Trees (BTs) represent a behavior-model based technology that has reached prominence in recent years for programming the behavior of autonomous agents, such as a robot, so that they may switch between a finite set of tasks so that contingency actions may be executed based on factors that occur during real-time task execution. For example, a behavior tree may comprise nodes classified as root nodes, control flow nodes, and task nodes. These nodes provide logic to guide switching between sequences of behaviors and/or sub-behaviors to handle task failures and/or unexpected challenges more gracefully (e.g., compared to switching between FSM states). However, under presently available technologies, BTs are agent centric. That is, a robot programmed to perform a mission under presently available BT technologies is programmed within the context of an individual actor performing a series of tasks. When completion of a complex task involves multiple autonomous mobile systems, and/or interactions with other task agents, current BT technologies are challenged because they do not holistically address actions of, and/or interactions between, a population of task agents involved in completing the mission.

In contrast to traditional systems for controlling autonomous machines, the systems and methods presented in this disclosure may provide, among other things, a mission controller that generates a framework, referred to herein as a mission behavior model logic framework, for an overall mission that accounts for the actions of a set of multiple task agents that play a role in completing the overall mission. Those task agents may include, for example, one or more autonomous mobile systems that can be reconfigured to perform different tasks (e.g., autonomous mobile robots), one or more specialized task agents that perform a limited set of predefined tasks (e.g., operate elevators and/or automated doors, or a user's smart device), and/or one or more non-operative task agents (e.g., a package, material, tool, person, animal, and/or other item or object being picked up, delivered, manipulated, and/or otherwise used by another task agent). In some embodiments, the mission controller may assemble a mission behavior model logic framework starting from a baseline task sequence. The baseline task sequence may include behavior models that represent actions taken by task agents during the performance of a mission. As explained in greater detail herein, the mission controller breaks down a mission into a series of behavior-based sequences that represent tasks performed by each of the task agents. Behavior-based sequences may include synchronization points to coordinate the behaviors of individual task agents.

For example, a mission controller may receive (e.g., from a user) a mission request that includes information defining a primary task to be performed by an autonomous system (e.g., obtaining an item and transporting that item to a designated delivery point). The mission controller may parse and/or infer primary task details from the mission request (e.g., using natural language processing or another language model), such as a primary task classification and/or one or more mission task customization parameters.

A primary task classification may indicate broadly an overall goal of mission request. For example, as non-limiting examples, a primary task classification may generally indicate that the primary task of the requested mission is to: pick up an item and deliver it to a location, pick up multiple items and deliver them to a location, go to a designated location to collect sensor data, to collect sensor data at multiple locations along a designated route, to perform a designated task at a designated location, to perform a designated task at multiple locations along a designated route, and/or other types of tasks. The mission task customization parameters may indicate user-specified substantive details used to customize a mission instance, such as identifying an item to be picked up and delivered, relevant locations where tasks are to be performed, types of sensor data to be collected, and/or otherwise specifying details regarding the actions and/or locations of local tasks involved in achieving the primary task.

In some embodiments, a mission controller may correlate the primary task indicated by a mission request to mission templates available from a mission template library. A mission template may specify a baseline task sequence (e.g., a high-level representation of a local task sequence) that when performed is expected to result in the plurality of task agents completing the primary task requested by the mission request. For example, a mission template corresponding to a single item pick-up and delivery task may include a sequence of local tasks to be performed by an autonomous mobile task agent, such as to: navigate to a location, interact with a first task agent (to pick up the item), navigate to another location, and interact with a second task agent (to provide the item). In this example, the first navigation task may correspond with sending an autonomous mobile task agent to a pick-up location for the requested item. The first task agent interaction may correspond with receiving the requested item while at the pick-up location. The second navigation task may correspond with navigating the autonomous mobile system (now in possession of the requested item) to a designated drop-off location. The second task agent interaction may correspond with relinquishing the requested item while at the drop-off location.

In some embodiments, a mission template for a task that uses more than one autonomous mobile task agent may indicate the number of autonomous mobile task agents to be used for completing the mission, and the baseline task sequence can include task sequences for each of those autonomous mobile task agents. The baseline task sequence may also include synchronization tasks, as needed, to coordinate actions between multiple task agents. In some embodiments, the mission template may further include a specification that indicates one or more criteria that define minimum capabilities for the individual task agents to be assigned to perform a task sequence. For example, the mission template may indicate that an autonomous mobile task agent assigned to a sequence must have at least two articulable robot arms, and/or have another specified configuration, capacity, characteristic, or rating.

As mentioned herein, the embodiments of the mission controller presented in this disclosure may holistically define and track actions of, and/or interactions between, the set of task agents involved in completing the mission. As such, while an autonomous mobile task agent may represent the principal task agent for performing a task (and some missions may include more than one principal task agent), the mission controller may further incorporate into a local task sequence local tasks performed by other task agents explicitly or implicitly implicated by the various tasks set forth by the baseline task sequence defined by the selected mission template.

For example, for a local task that involves an autonomous mobile task agent interacting with another task agent at the first (pick-up) location, the mission controller may include a task sequence for a pick-up location task agent that accounts for actions such as the item being placed at the pick-up location prior to the arrival of the autonomous mobile task agent. In some embodiments, a task sequence for the pick-up location task agent may include a task to place an order for the item for pick-up at the pick-up location. The task sequence may include the pick-up location task agent sending an acknowledgement indicating a designated time slot to pick up the item at the pick-up location. The mission controller may further include synchronization tasks to facilitate coronation between the autonomous mobile task agent and the pick-up location task agent (e.g., to ensure that the autonomous mobile task agent waits until the pick-up location task agent presents the item for pick-up at the pick-up location before proceeding to the drop-off location).

For a local task that involves interaction with a task agent at the second (drop-off) location, the mission controller may include a task sequence for a drop-off location task agent that accounts for the item being placed and accepted at the drop-off location to complete the requested mission. Moreover, in some embodiments, the mission controller may instantiate a task agent that represents the requested item itself, and include that task agent for the item in the timeline of the local task sequence. That is, the item may be defined by the mission controller as a non-operative task agent that represents a component of the overall mission that may possess a state or condition relevant to the successful completion of the primary task. The item may be assigned the task of being delivered, for example. The resulting task sequence thus represents a synchronized sequence of local tasks involving a heterogeneous system of task agents, each performing a defined part in completing the primary task requested via the mission requirements.

In some embodiments, once the mission controller selects a mission template for the requested mission, the mission controller proceeds to assembling a mission behavior model logic framework for a mission instance based on correlating tasks defined by the mission template with predefined behavior models, and customizing those behavior models based on mission task customization parameters. As discussed herein, mission task customization parameters may be derived directly from the mission request and/or determined based on navigation routes for mobile and autonomous machine agent(s). The individual tasks of the baseline task sequence may each correspond to a predefined behavior model (e.g., a behavior tree) that defines a plan of execution for a task agent to accomplish that individual task. For example, if the baseline task sequence calls for an autonomous mobile task agent to go to a first location, pick up an item, bring the item to a second location, and deposit the item, then the mission controller may correlate those tasks in the baseline task sequence with behavior models available from a task library. The mission controller may obtain from the task library a first behavior model with instructions used for navigating (e.g., to travel to the first location), a second behavior model used to perform an external interaction (e.g., to receive an item), a third behavior model with instructions used for navigating (e.g., to travel to the second location), and a fourth behavior model used to perform an external interaction (e.g., to deposit the item).

The mission controller may further obtain from the task library at least one behavior model corresponding to the actions of specialized task agents, such as a behavior model corresponding to the task agent at the pick-up zone at the first location, and/or corresponding to the task agent that accepts the item at a delivery zone at the second location. In some embodiments, such specialized task agents may not directly execute a behavior model. Instead, the mission controller may execute a proxy representation of the behavior model to represent an estimated state of that task agent as the mission is performed by the various task agents. For example, a behavior model assigned to the pick-up task agent may model a behavior for the ordering of the item, receiving an estimated window of time when the item will be at the pick-up zone, and receiving an acknowledgement when the item has been placed in the pick-up zone.

In some embodiments, the actions of a behavior model of an autonomous mobile task agent may be synchronized with the behavior model of the pick-up task agent to ensure that the autonomous mobile task agent arrives at the pick-up zone within a designated time window. A synchronization task may also be used to trigger retrieval of the item from the pick-up zone once the item is placed at the pick-up zone by the pick-up task agent. The mission controller may introduce conditional wait tasks into a task sequence for a task agent, such as a wait task for the autonomous mobile task agent to wait at the pick-up zone until the pick-up task agent provides the item, before proceeding to the next task. In some embodiments, such conditional behaviors may be pre-programmed into the behavior model for a task. For example, the behavior model for a pick-up task agent may comprise a behavior tree having a control flow node that conditions successful task completion on detecting that the item has been secured from the pick-up zone. Similarly, the item drop-off acceptance task agent at the designated delivery location may be assigned a behavior model that sends an acknowledgement to the mission controller when the item has been successfully accepted from the autonomous mobile task agent. The acknowledgement may be used by the mission controller to update the status of a task agent, to flag the mission as completed, and/or trigger an autonomous mobile task agent to return to a staging location to await a next mission assignment. In some embodiments, an autonomous mobile task agent may comprise one or more sensors (e.g., a camera or proximity sensor) that may detect when another task agent has completed a task, and synchronization points may be built in as nodes within a task agent's behavior model to proceed upon observing the other task agent completing their respective task.

As mentioned herein, the mission controller may obtain, from the task library, at least one behavior model corresponding to a non-operative item, such as an object being delivered. In some embodiments, the mission controller may execute a proxy representation of a behavior model for the non-operative item that may simply indicate whether it has been successfully delivered or not. For example, if the autonomous mobile task agent irretrievably drops or damages the item during transport, the behavior model for the item may indicate that it is no longer suitable for delivery, prompting the mission controller to perform a contingency action (as further described below). Similarly, for an item that can become stale or unusable if not delivered within a time period, the behavior model for the item may keep track of how long the item has been in transport since leaving the first location, and the behavior model for the item may indicate when the item is no longer suitable for delivery after that period expires, similarly prompting the mission controller to perform a contingency action.

For each behavior model retrieved from the task library, the mission controller may customize the behavior model based on the mission task customization parameters to generate custom behavior models specific for the given mission request. For example, the mission task customization parameters may specify the item being requested, the location to which it should be delivered, and/or other parameters, such as a desired time of delivery. This information may be used to customize the behavior models of the individual task agents involved in each mission instance.

For the behavior models retrieved from the task library, the mission controller may obtain a pre-defined baseline behavior model that it augments with additional behavior models as a function of the mission task customization parameters to generate the custom behavior models. For example, as mentioned above, the mission controller may obtain a behavior model with instructions used for navigating to the first location (the pick-up location), and then augment that model with the specific routing information to navigate an autonomous mobile task agent from its current location to the specific coordinates of the pick-up location where the item will be obtained from the pick-up agent. Synchronization points in the task sequence may be used to introduce delays to support for interactions where an autonomous mobile task agent needs to receive an item from another task agent, hand off an item to another task agent, and/or otherwise coordinate actions with another task agent to complete a task (e.g., a task where two or more task agents coordinate their actions to lift and move an object or perform another complex collaborative task). In some embodiments, synchronization points between task agents may be added to a task sequence based on a task optimization algorithm. For example, where a mission involves two autonomous mobile task agents that may both efficiently utilize a third task agent simultaneously, such as an elevator, synchronization points may be added to the task sequence for the mission controller to have the first autonomous mobile task agent wait for the arrival of the second autonomous mobile task agent (or confirm that it is within a threshold time of arriving) before calling the elevator.

In some embodiments, the mission controller may determine a class of autonomous mobile task agent(s) to be specified for a mission based on information provided by the mission template. The mission controller may identify and select one or more autonomous mobile task agents that are in service and available to participate in the mission based on specifications provided by the mission template. In some embodiments, the mission controller may reserve the services of an autonomous mobile task agent based on determining that it is available and that it is at a location closest to one or more of the tasks to be performed.

For navigation tasks, in one or more embodiments, the mission controller may compute an optimal route for an autonomous mobile task agent to navigate from its current location to a destination location. The route may be computed using a virtual facility map that describes the physical infrastructure and layout of the facility. Based on the route, the mission controller may generate a behavior model (e.g., a behavior tree) that defines a navigation task sequence that describes the en route tasks the autonomous mobile task agent will need to perform to navigate to the destination location. Depending on the selected route, the autonomous mobile task agent may arrive at waypoints along the way that require the autonomous mobile task agent to take one or more en route actions in order to continue on the route. For example, the facility map may show that a computed route for an autonomous mobile task agent includes, for example, one or more automated doors, turnstiles, lifts (e.g., elevators), moving transport platforms, and/or other synchronization points that the autonomous mobile task agent may need to engage with to complete the task of navigating to its destination. The mission controller may augment the base behavior model obtained from the mission template with behavior models populated with custom parameters relevant to the navigation task sequence corresponding with the en route actions of the selected route.

For example, the mission controller may compute a route to navigate the autonomous mobile task agent from an origin point "A" to a destination point "B," which may include using an elevator to change floors. The corresponding navigation task sequence may include one or more customized behavior models that include instructions for navigating the autonomous mobile task agent to the location of the elevator doors, waiting for the elevator doors to open, entering the elevator, and riding the elevator to the destination floor. The customized behavior models may further include instructions for waiting for the elevator doors to open on the destination floor, exiting the elevator, and navigating from the location of the elevator doors to the next destination. In one or more embodiments, the mission controller may obtain default behavior models from the task library, and adjust and/or augment those behavior models to accommodate the specific tasks encountered along the selected route. For example, additional behaviors may be added to the default behavior models to generate a custom behavior model that is adjusted for the given mission request. Similarly, the mission controller may obtain a default behavior model from the task library with baseline navigation instructions used for navigating from a pick-up location to a delivery location, and then augment that behavior model with the specific routing information to generate customized behavior models to navigate the autonomous mobile task agent from the item pick-up location to the next location where the item will be delivered.

In some embodiments, to implement a mission instance, the mission controller may push, or otherwise provide, the mission behavior model logic framework, or one or more segments thereof, to a mission dispatch function. The mission dispatch function may manage communications between the mission controller and the autonomous mobile task agent(s), and may distribute the segments of the mission behavior model logic framework to the one or more autonomous mobile task agents identified in the mission behavior model logic framework. The individual autonomous mobile task agents may then proceed to execute their assigned portions of local task sequences in accordance with the customized behavior models distributed to them by the mission dispatch function.

The mission dispatch function may further provide one or more bidirectional communications channels between the autonomous mobile task agents and the mission controller during execution of a mission instance. The bidirectional communications channels may be used, for example, to communicate status updates, feedback data, and/or synchronization control information. In some embodiments, bidirectional communications channels may comprise wireless communication links implemented using a facility wireless network infrastructure (e.g., using WiFi IEEE 802.11, Bluetooth IEEE 802.15.1, millimeter wave technology, ultra-wideband (UWB) technology, cellular telephone technology, and/or other wireless standards). In some embodiments, the mission dispatch function and autonomous mobile task agents may communicate using the VDA 5050 standard interface for communications between mobile robots and a central management system. In some embodiments, the mission dispatch function may communicate with a mission client embedded in the autonomous mobile task agent that manages communications between on-board operating functions of the autonomous mobile task agent and the mission dispatch function. A mission client may further comprise implementing functions to execute the behavior models distributed to the autonomous mobile task agent.

In some embodiments, a segment of the mission framework sent by the mission dispatch function sent to the autonomous mobile task agent may comprise a complete sequence of the behavior models they will execute during the mission instance. Providing the autonomous mobile task agent with the complete sequence of behavior models may be beneficial in environments where communications between the autonomous mobile task agent and the mission dispatch may be unreliable and/or potentially lost (e.g., when an agent travels through a communication dead zone). In some embodiments, the mission dispatch function may instead sequentially send portions of the complete sequence of behavior models, for example, by sending the behavior model(s) for one or more upcoming tasks as prior tasks are completed, or based on other milestones. Distributing portions of the complete sequence of behavior models over time may be advantageous where the task being performed by an autonomous mobile task agent is likely to change as a mission progresses, or where the on-board memory of an autonomous mobile task agent for storing behavior models is limited.

In some embodiments, the mission controller may communicate with one or more other facility management systems (e.g., a building management system (BMS)), or a network accessible API (e.g., an application program interface), to operate task agents, and/or receive status information for task agents, which may not be accessible via the mission dispatch function. For example, the mission controller may send calls to a facility management API (e.g., an application program interface) to access functions and services of the facility management system to control and/or obtain data from facility infrastructure devices (e.g., elevators, automatic doors, environmental sensors, security system sensors, and/or other devices). Utilizing the mission controller to process building infrastructure requests through the facility management system and/or a network-accessible API may be advantageous as it avoids having to individually program autonomous mobile task agents to operate the different varieties of doors, elevators, and/or other building infrastructure devices they may encounter. In one or more embodiments, an API used by a mission controller may comprise a Representation State Transfer (REST) API, a Robot Operating System (ROS) derived processes and/or messaging API, or other form of API.

In some embodiments, the mission controller may execute one or more proxy representations of behavior models (e.g., that simulate the execution of a behavior model) to account for actions of auxiliary task agents that may interact with an autonomous mobile task agent but are not directly programmed with a behavior model from the mission behavior model logic framework. For example, the mission controller may associate a specialized task agent with an elevator and execute a proxy representation of a corresponding elevator behavior model to track interactions with the elevator during the course of a mission instance. In some implementations, an autonomous mobile task agent may comprise functionality to directly operate functions of other task agents (e.g., using wireless communications and/or an actuator to physically push buttons to operate an automated door or elevator). Alternatively, the mission controller may interface with an API and/or a facility management system that controls operations of the other task agent on behalf of the autonomous mobile task agent, and execute a proxy representation behavior model for the other task agent based on information communicated with the API and/or the facility management system.

For example, in some embodiments, the mission controller may determine when an autonomous mobile task agent is within a threshold proximity of an elevator door, and issue a call to an API to call the elevator to the floor on which the autonomous mobile task agent is located. One the autonomous mobile task agent has entered the elevator, the mission controller may issue a call to the API to select a floor so that the autonomous mobile task agent may continue on its established route. The mission controller may keep track of the status of the elevator, using its corresponding behavior model proxy representation, based on status information from the API. In a similar manner, the mission controller may define task agents and/or behavior model proxy representations to facilitate other en route actions (e.g., automated doors, turnstiles, transport platforms, and the like). The mission controller may populate the behavior models with custom parameters relevant to the navigation task sequence corresponding with the selected route and/or the mission task customization parameters obtained from the mission request and then operate the task agents via an API and/or the facility management system based on executing a proxy representation of that task agent's behavior model.

As mentioned above, the mission controller may compute an optimal route for an autonomous mobile task agent based on a digitized map of the facility. For example, the mission controller may retrieve a digital map of the facility and convert the map into a graphical representation of a traversable area that may be used for routing mobile autonomous task agents. Based on the digital facility map, the mission controller may compute an optimal route through graphical representation of the facility between a start point and an end point. The route may be communicated to the autonomous mobile task agent (e.g., by the mission dispatch) as a behavior model (e.g., a behavior tree).

In some embodiments, the autonomous mobile task agent may comprise a navigation system that executes the behavior model to navigate the route, but also comprise embedded algorithms and/or behavior models, for example, to detect and navigate around local hazards and/or obstacles while traversing the route. The navigation system may also request an alternate route from the mission controller due to unforeseen circumstances, such as an obstacle that renders the planned route unusable.

In one or more embodiments, the mission controller may incorporate route traffic data when determining which route is the optimal route for an autonomous mobile task agent. For example, the mission controller may receive traffic data captured from sensors along a route, and/or reported by other task agents, indicating when the use of a potential route may be blocked or slowed because of an obstacle (e.g., objects and/or spills). Traffic data may indicate when a route is congested due to usage by people or other task agents. Based on the traffic data, the mission controller may assess a weighted penalty time to those routes with detected obstacles and/or congestion (e.g., adding an expected delay time to the time nominally computed for the route) and the optimal route for the autonomous mobile task agent computed taking into account the penalty time. The traffic data may include historical traffic pattern data. For example, the mission controller may determine from historical traffic pattern data that corridors near a facility café or cafeteria experience heavier traffic during a lunch hour time window (e.g., between 11:30 am and 1:00 pm) and factor an additional penalty time delay into route planning and optimization for those corridors. In some embodiments, the mission controller may bias optimization to favor routes that avoid human traffic.

In some embodiments, the mission controller may comprise one or more software applications implemented on a cloud-based computing platform. The mission controller may receive a mission request from a user device having access to the services of the mission controller (e.g., via a network).

As explained above, the mission controller performs task sequencing based on one or more primary tasks represented by the mission request to generate a local task sequence that involves a plurality of local tasks performed by a plurality of task agents. The task sequencing may comprise building a task sequence for the mission behavior model logic framework starting from a mission template retrieved from a mission template library. The mission template may comprise a baseline task sequence that the mission controller uses as a foundation for attaching behavior models that correlate to the baseline tasks of a mission template. The behavior models may be pre-defined modular behavior models that may be retrieved from a task library and customized based on mission task customization parameters from the mission request, and/or to accommodate en route actions to generate custom behavior models specific for the given mission request.

In some embodiments, the mission controller may assemble a mission behavior model logic framework based on a compilation of the local task sequences derived from the mission template, for a plurality of individual task agents involved in performing the mission. The mission behavior model logic framework includes the task sequences for the individual task agents and their corresponding customized behavior models, and thus provides a holistic representation of each of the individual task agents involved in completing the mission, including interactions and synchronizations between those task agents. The mission behavior model logic framework includes the customized behavior models that may be distributed to task agents for execution and/or implemented via proxy representations of behavior models by the mission controller itself to complete performance of the primary task(s) represented by the mission request.

Once assembled, the mission behavior model logic framework may be assigned a unique mission ID (e.g., a Universal Unique Identifier (UUID)), which may be used to identify the mission instance. The assembled mission behavior model logic framework may be stored to a persistent data store (e.g., a database). The mission behavior model logic framework may be queued until task agent resources are available to execute the mission instance. In some embodiments, the mission behavior model logic framework may be stored as a database where each task agent is associated with an array, and each array contains a node that defines the top of a behavior model (e.g., a behavior tree) for each task in their respective task sequence. The database may also include synchronization points between arrays where synchronization tasks between task agents occur.

Once segments of the mission behavior model logic framework comprising customized behavior models are distributed, execution of a mission instance may commence. During execution of a mission instance, the mission controller may monitor the status of the plurality of task agents assigned to the mission. For example, the task agents deployed to perform tasks of the mission instance may be associated with the unique mission ID assigned to the mission behavior model logic framework. The task agents may report feedback data that includes indications of their progress and/or status with respect to executing and/or completing their assigned tasks (e.g., task not started, task in progress, in synchronization, etc.). For in-progress tasks, a task agent may report, for example, a percentage of the task that is completed and/or an estimated time to completion. The task agents may further report back to the mission controller feedback data that includes sensor and/or telemetry data. In some embodiments, the mission controller may initiate activation or otherwise control one task agent based on a status report for another task agent. For example, the mission controller may initiate activation of a task agent to open an automated door and/or call an elevator, based on a status report received from an autonomous mobile task agent that is approaching within a threshold distance and has been assigned a route that uses the automated door and/or elevator.

Task agents may also communicate to the mission controller when the completion of a local task is delayed and/or fails. In response, the mission controller may evaluate one or more contingency options and reprogram the behavior model for that task agent. For example, the mission controller may select an alternate task (or an alternate task agent) as a contingency when a delay or failure is reported and reassemble the behavior model logic framework with updated behavior models. In some embodiments, the task library may include one or more tasks specifically designated as contingency tasks with behavior models designed for contingency scenarios. The mission dispatch may transmit the updated behavior models to the affected autonomous mobile task agents to replace the prior behavior models.

As previously mentioned, non-operable objects (e.g., an item tasked for delivery that may become stale or spoiled) may be defined as a task agent assigned to a mission instance. As an example, the mission controller may treat a perishable item as a task agent of the mission, with a behavior model that tracks the freshness versus staleness of the item as it is transported to a delivery location. In the event that the item is not delivered before it transitions to a spoiled state, the mission controller may adjust the mission behavior model logic framework to obtain a fresh instance of the item by adjusting behavior models of existing task agents and/or adding one or more new task agents to the mission behavior model logic framework. The updated behavior models of the mission behavior model logic framework may then be provided to the affected autonomous mobile task agents by the mission dispatch function. As another example, when crowd/traffic information is available, a route and/or other mission parameters may be dynamically altered to avoid traversing heavily populated areas that may result in the robot slowing down and the item spoiling.

The mission and task libraries used by a mission controller to plan and control the behavior of automated task agents may be customized to perform tasks within the context of many different types of facilities such as, but not limited to, warehouses, factories, school or corporate campuses, office buildings, laboratories, healthcare institutions, industrial sites, residential buildings and/or other types of facilities. In some embodiments, the mission controller may be implemented as one or more server applications hosted by a cloud computing platform, and a user at a facility may operate a user device (e.g., a computer or smart device) to access services of the mission controller to submit a mission request. The mission controller may access a mission template library and/or task library customized to the particular types of tasks that autonomous mobile task agents are used to perform at that facility. For example, in a healthcare facility, a commonly requested task may be for an autonomous mobile task agent to perform sterilization tasks (e.g., to enter a room and spray a sterilizing agent (or apply a strong UV light) within that room). In such a case, a mission template library for that facility may include mission templates comprising baseline task sequences that include actions for directing a sterilization mobile task agent to navigate to the vacated room and apply the sterilizing agent. The pre-defined baseline behavior models available from the task library for that facility may also include customized behavior models. For example, the task library may include a behavior model that may be added as a node to the baseline task sequences to operate the sterilization mobile task agent with instructions indicating where and how to apply the sterilizing agent, and/or to pause if it detects a human entering the room. As another example, a healthcare facility may require autonomous mobile task agents that enter or leave certain designated zones to be sterilized (e.g., to prevent the spread of contaminants and/or pathogens). In such embodiments, the mission controller may determine the location of sterilization stations (e.g., from the facility map) on a task agent's route and insert a node for a behavior model for using the sterilization stations as a standard en route navigation task for missions in that facility.

The types and/or classes of deployed autonomous mobile task agents may also vary from facility to facility, with different facilities having different combinations of specialized and general purpose autonomous mobile task agents. Accordingly, to assemble a mission behavior model logic framework to fulfill a mission request at a given facility, the mission controller may access mission templates and behavior models from a mission template library and task library comprising templates and behavior models configured for the types and classes of task agents available at that facility. The modular nature of mission templates readily facilitates adding additional behavior model nodes to customize mission libraries to accommodate a diverse set of potential users and/or changing needs.

In some embodiments, a mission template may be generated using a JavaScript Object Notation (JSON) data format to define baseline task sequences used to build the mission behavior model logic framework for a missions request. In some embodiments, a mission template may define a baseline task sequence using natural language descriptions of the task to be performed. For example, the mission controller may use natural language processing (NPL), a large language model (LLM), autoregressive language model, and/or other language modeling (LM) technology to correlate tasks described by a mission template with behavior models used to assemble the mission behavior model logic framework. As a non-limiting example, behavior models, such as behavior trees, may be generated using available software development libraries, such as the Python library "py_trees".

Once developed, mission templates and behavior models may be reused to implement multiple mission requests, with the mission task customization parameters and routing information used to customize the behavior models for particular mission instances. In some embodiments, a facility operator may generate their own mission templates and/or behavior models and load them into the mission template library and/or task library for their facility. For example, the set of pre-defined modular behavior models in the task library may be updated to include an instance of a frequently used customized behavior model, and the mission template library may be updated based on updates to the task library (e.g., to generate a new mission template for a baseline task sequence that includes a new behavior model added to the task library). In some embodiments, mission templates may be updated to reflect changes to classes of task agents available at a facility where missions are performed.

With reference to FIG. 1, FIG. 1 is a data flow diagram for an example behavior-based mission task management system 100 for autonomous machines, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 600 of FIGS. 6A-6D, example computing device 700 of FIG. 7, and/or example data center 800 of FIG. 8.

As shown in FIG. 1, behavior-based mission task management system 100 may comprise a mission controller 120 that receives and processes a mission request 105 generated by a user from a user device 102, and based on the mission request 105, generates a mission behavior model logic framework 150, which may be used to control one or more task agents to carry out the requested mission. The mission controller 120 may include a mission request parsing function 122 that evaluates the mission request 105 to determine a primary task indication 124 (e.g., an indication of the one or more primary tasks requested by the user) and one more mission task customization parameters 126. In some embodiments, the mission request parsing function 122 uses natural language processing (NLP) and/or a language model (LM) to infer one or both of the primary task indication 124 and the one or more mission task customization parameters 126. The mission controller 120 may correlate the primary task indication 124 against mission templates defined in a mission template library 128 to obtain a baseline task sequence 130 corresponding to a primary task requested by the mission request 105.

The mission controller 120 may further comprise a mission instance assembly function 132 that performs customized behavior model sequencing 144 to generate the mission behavior model logic framework 150. For example, the mission instance assembly function 132 may correlate individual local tasks defined by the baseline task sequence 130 against tasks defined by a task library 134 to determine one or more pre-defined modular behavior models 136 that the mission instance assembly function 132 attaches to the local tasks defined by the baseline task sequence 130. As discussed herein, the mission task customization parameters 126 may indicate user-specified substantive details used to customize a mission instance, such as identifying an item to be picked up and delivered, relevant locations where tasks are to be performed, types of sensor data to be collected, and/or otherwise specifying details regarding the actions and/or locations of local tasks involved in achieving the primary task. As such, the customized behavior model sequencing 144 may generate customized behavior models by augmenting the pre-defined modular behavior models 136 based on the mission task customization parameters 126. The mission instance assembly function 132 may include a navigation routing function 138 that computes an optimized route for one or more autonomous mobile task agents 170 that carry out tasks of the mission. The route may be computed by the navigation routing function 138 based on the location of tasks defined by the baseline task sequence 130 and/or details specified by the mission task customization parameters 126, using a digital facility map 140 that describes the physical infrastructure and layout of the facility.

In one or more embodiments, the navigation routing function 138 may incorporate traffic data 142 when determining which route is the optimal route for an autonomous mobile task agent. For example, the navigation routing function 138 may receive traffic data 142 captured from sensors along a route (e.g., generated using a smart cities system, a security system, CCTV, satellite imaging, surveillance systems, other autonomous agents, etc.), and/or reported by other task agents, indicating when the use of a potential route may be blocked or slowed because of an obstacle (e.g., objects and/or spills). Traffic data 142 may indicate when a route is congested due to usage by people or other task agents. Based on the traffic data 142, the navigation routing function 138 may assess a weighted penalty time to those routes with detected obstacles and/or congestion (e.g., adding an expected delay time to the time nominally computed for the route) and the optimal route for the autonomous mobile task agent computed, taking into account the penalty time. The traffic data 142 may include historical traffic pattern data. For example, the navigation routing function 138 may determine from historical traffic pattern data that corridors near a facility café or cafeteria experience heavier traffic during a lunch hour time window (e.g., between 11:30 am and 1:00 pm) and factor an additional penalty time delay into route planning and optimization for those corridors. In some embodiments, the navigation routing function 138 may bias optimization to favor routes that avoid human traffic. Based on the computed route, the mission controller 120 may generate one or more navigation behavior models 139 that define a navigation task sequence that describes one or more en route tasks that the autonomous mobile task agent(s) 170 will need to perform to navigate to a designated location. The navigation behavior models 139 may be used to further augment the pre-defined modular behavior models 136 to generate the customized behavior models used for the mission behavior model logic framework 150. In some embodiments, baseline navigation behavior models may be obtained by the navigation routing function 138 from the task library 134 and customized based on the computed route to form the one or more navigation behavior models 139. The mission instance assembly function 132 may perform the customized behavior model sequencing 144 using the customized behavior models based on the sequence of local tasks defined by the baseline task sequence 130 to generate mission-customized task sequences for the one or more of the task agents involved in performing tasks for the requested mission, and compile those mission-customized task sequences into the mission behavior model logic framework 150.

In some embodiments, the mission instance assembly function 132 of the mission controller 120 may determine a class of autonomous mobile task agent(s) to be specified for a mission based on information provided by a mission template. The mission instance assembly function 132 may query task agent availability information (shown at 146) to identify one or more autonomous mobile task agents that are in service and available to participate in the mission based on specifications provided by the mission template. In some embodiments, the mission instance assembly function 132 may reserve the services of an autonomous mobile task agent 170 based on determining that it is available and that it is at a location closest to one or more of the tasks to be performed.

Figure 2A:
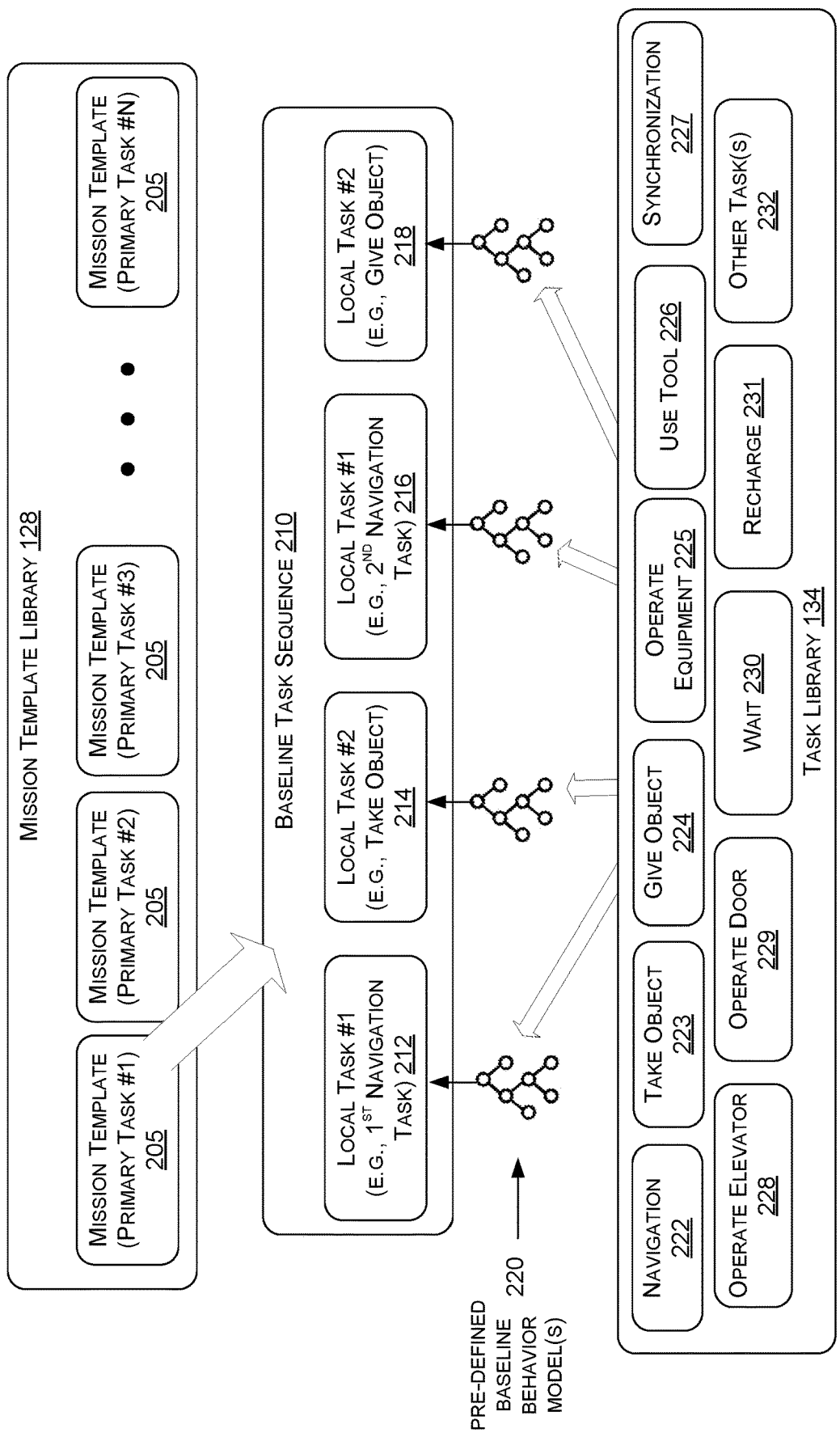
FIG. 2A is a block diagram that illustrates generating a baseline task sequence from a mission template using a mission template library and task library, in accordance with some embodiments of the present disclosure.

For example, referring to FIG. 2A, FIG. 2A illustrates a mission template library 128 comprising a plurality of pre-defined mission templates (shown at 205), each corresponding to a different primary task. By correlating the primary task indication 124 against the available mission templates 205, the mission controller 120 may select a mission template 205 comprising an appropriate baseline task sequence 210 for performing the requested mission. As shown in FIG. 2A, a mission template 205 may define a baseline task sequence 210 that includes a sequence of local tasks (shown at 212, 214, 216, and 218) that correspond to performing a requested primary task. In the example shown in FIG. 2A, local task 212 may comprise a first navigation task, local task 214 may comprise a take object task, local task 216 may comprise a second navigation task, and local task 218 may comprise a give object task. Such a baseline task sequence 210 may be used, for example, to obtain an object from a first location, and deliver it to a second location. Also, as shown in FIG. 2A, the task library 134 may comprise a plurality of tasks (e.g., task modules) that each includes a pre-defined baseline behavior model that describes a sequence of behaviors for performing that task. As a non-limiting example, tasks included in the task library 134 may include tasks for navigation 222, taking an object 223 (e.g., from another task agent), giving an object 224 (e.g., to another task agent), operating equipment 225, using a tool 226, synchronizing 227 (e.g., with other task agents), operating an elevator 228, operating a door 229, a conditional wait task 230 (e.g., pausing until a condition is met), a recharging task 231, and/or one or more other tasks 232. By correlating a local task defined by the baseline task sequence 210 against the tasks available from the task library 134, the mission controller 120 may select a task from the task library 134 and the corresponding pre-defined baseline behavior model(s) to perform that local task (as shown at 220).

Figure 2B:
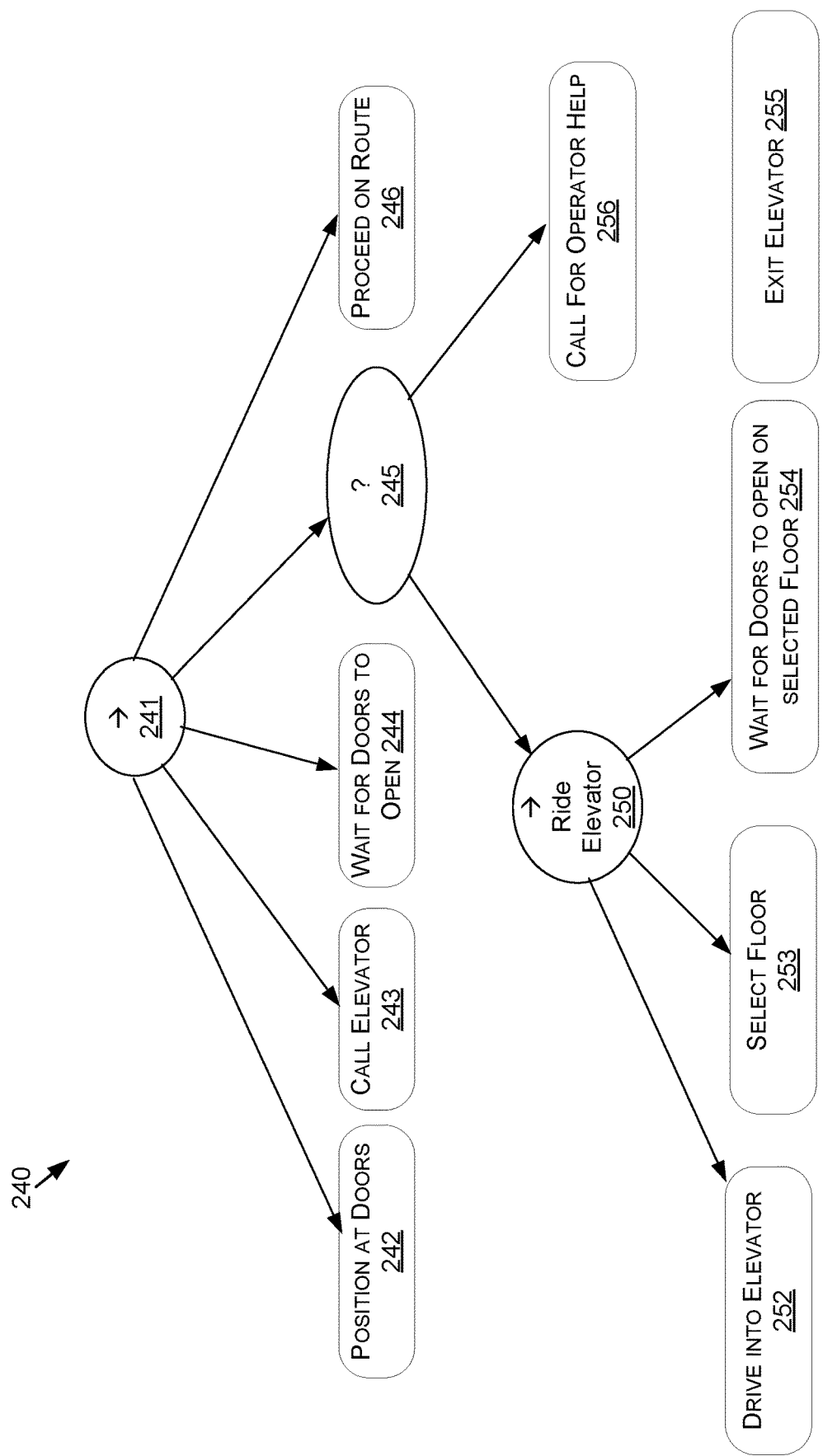
FIG. 2B is a diagram illustrating an example behavior model, in accordance with some embodiments of the present disclosure.

For purposes of example, FIG. 2B illustrates, at 240, a pre-defined baseline behavior model that may be executed by a mobile autonomous machine agent 170 to use an elevator. In this example, the behavior model 240 comprises a behavior tree that includes a sequential node as its root node 241. As a sequential node, the root node 241 indicates that each of the child nodes connected beneath the root nodes are performed sequentially (e.g., starting from the left, the behavior defined by each child node is performed and completed before the next child node to the right is started).

The first child node 242 from the root node 241 is an action node directing a mobile autonomous machine agent 170 to position itself at the doors of the elevator. The second child node 243 is an action node directing the mobile autonomous machine agent 170 to call the elevator. The third child node 244 is an action node directing the mobile autonomous machine agent 170 to wait for the elevator doors to open. The fourth child node 245 is a conditional fallback node to which behaviors for riding the elevators are attached as a sub-model. The fourth child node 245 is a conditional fallback node in that its second child node 256 (Call for Operator Help) is only performed if its first child node 250 (Ride Elevator) fails to be completed successfully. With respect to the node 250, this node comprises a sequential node as its root node 241, which indicates that the child nodes connected beneath the Ride Elevator node 250 are performed sequentially (e.g., starting from the left). The first child node 252 from the Ride Elevator node 250 is an action node directing a mobile autonomous machine agent 170 to drive into the elevator through the open elevator doors. The second child node 253 from the Ride Elevator node 250 is an action node to select the destination floor. The third child node 254 from the Ride Elevator node 250 is an action node directing the mobile autonomous machine agent 170 to wait on the elevator until the elevator doors open on the selected destination floor. The fourth child node 255 from the Ride Elevator node 250 is an action node directing the mobile autonomous machine agent 170 to exit the elevator through the opened doors. The completion of the fourth child node 255 indicates the successful completion of the behavior sequence for the Ride Elevator node 250 so that from the root node 241, the next child node 246 (which is an action node) directs the mobile autonomous machine agent 170 to proceed on its route. It should be noted that as described above, the behavior model 240 may be considered a baseline behavior model, as details such as which elevator to use, where the elevator doors are located, and what destination floor to select are not yet populated into the behavior model 240. Such details may be derived from the mission task customization parameters 126 and/or specified by the navigation routing function 138 to augment the behavior model 240 into a customized behavior model.

Figure 2C:
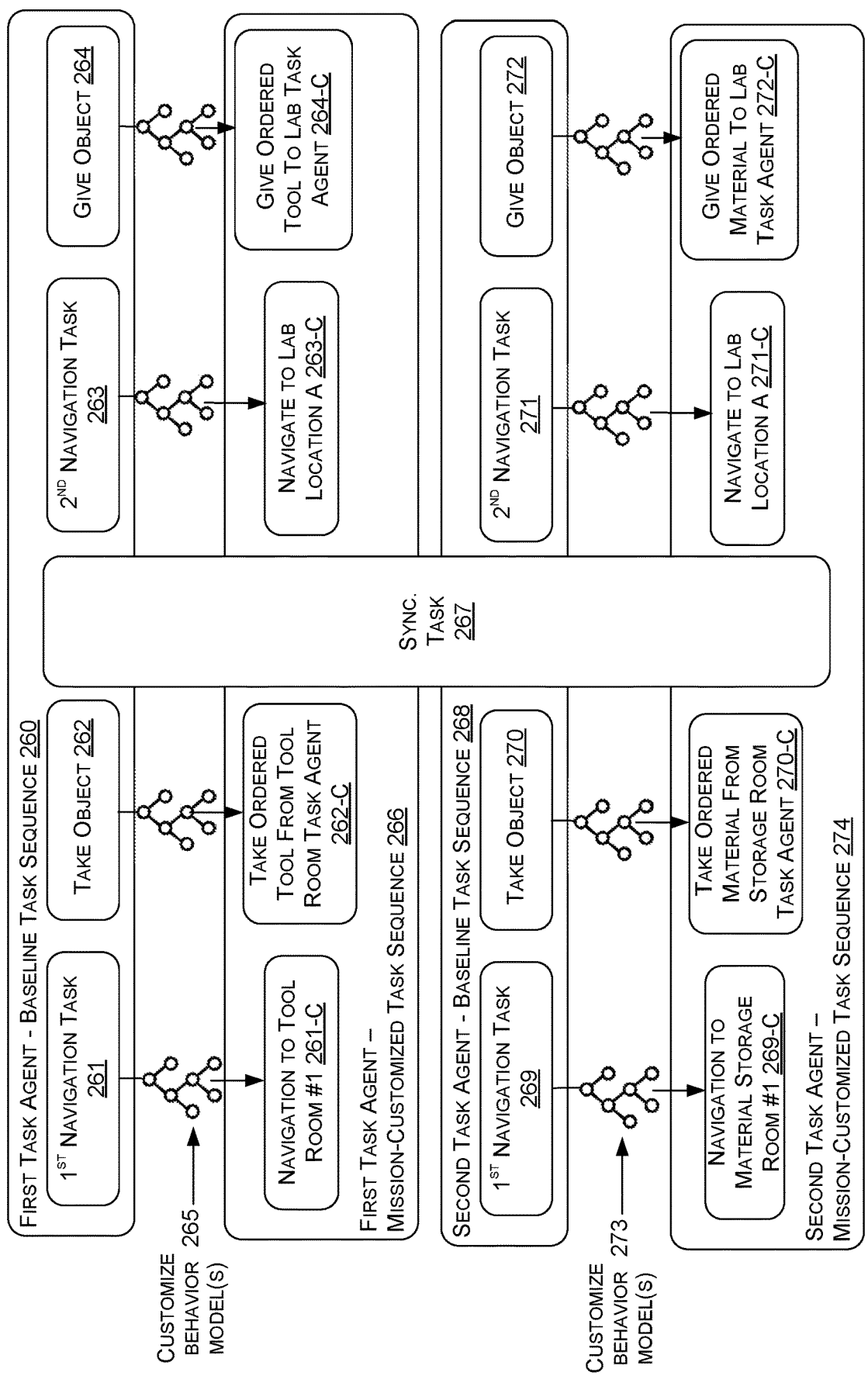
FIG. 2C is a diagram illustrating augmentation of baseline task sequences to generate mission-customized task sequences, in accordance with some embodiments of the present disclosure.

Referring now to FIG. 2C, FIG. 2C illustrates generation of mission-customized task sequences from a baseline task sequence, with a synchronization task to synchronize the actions of two mobile autonomous machine agents 170. In this example, a first mobile autonomous machine agent 170 is to perform a task of delivering a specified tool ordered from a tool room to a specified laboratory location, while a second mobile autonomous machine agent 170 is to perform a task of delivering a specified material ordered from a material storage room to the same specified laboratory location. Here, the baseline task sequence 260 for the first task agent comprises a first navigation task 261, a take object task 262, a second navigation task 262, and a give object task 264. The behavior models for each of these local tasks may be customized (as indicated at 265) based on the mission task customization parameters 126 and/or as specified by the navigation routing function 138 to augment the baseline task sequence 260 to form the mission-customized task sequence 266. Based on the customization of the baseline behavior models from the baseline task sequence 260, the mission-customized task sequence 266 includes a first customized navigation task 261-C that directs the first mobile autonomous machine agent 170 to navigate to tool room #1 (and which may further indicate a location of tool room #1), a customized take object task 262-C that directs the first mobile autonomous machine agent 170 to obtain the ordered tool from the tool room task agent (and which may further identify what tool is to be obtained), a second customized navigation task 263-C that directs the first mobile autonomous machine agent 170 to navigate to laboratory location A (and which may further indicate a location of laboratory location A), and a customized give object task 264-C that directs the first mobile autonomous machine agent 170 to relinquish the ordered tool to a laboratory task agent (and which further may include reporting the completed mission-customized task sequence 266 to the mission controller 120).

Similar to the baseline task sequence 260 for the first task agent, the baseline task sequence 268 for the second task agent comprises a first navigation task 269, a take object task 270, a second navigation task 271 and a give object task 272. The behavior models for each of these local tasks may be customized (as indicated at 273) based on the mission task customization parameters 126 and/or as specified by the navigation routing function 138 to augment the baseline task sequence 268 to form the mission-customized task sequence 274. Based on the customization of the baseline behavior models from the baseline task sequence 268, the mission-customized task sequence 274 includes a first customized navigation task 269-C that directs the second mobile autonomous machine agent 170 to navigate to material storage room #1 (and which may further indicate a location of material storage room #1), a customized take object task 270-C that directs the second mobile autonomous machine agent 170 to obtain the ordered material from a material storage room task agent (and which may further identify what material is to be obtained), a second customized navigation task 271-C that directs the second mobile autonomous machine agent 170 to navigate to laboratory location A (and which may further indicate a location of laboratory location A), and a customized give object task 272-C that directs the second mobile autonomous machine agent 170 to relinquish the ordered material to a laboratory task agent (and which further may include reporting the completed mission-customized task sequence 274 to the mission controller 120).

Moreover, the mission-customized task sequence 266 and the mission-customized task sequence 274 may be linked by at least one synchronization task 267 inserted within each of the respective sequences. For example, it may be necessary to have the ordered tool in order for a technician at laboratory location A to use the ordered material. As such, during the synchronization task 267, the first and second task agents may each pause until they've confirmed with the mission controller 120 that the other has successfully secured their respective items before proceeding to the laboratory location A destination. In other embodiments, the synchronization task 267 may be used to offset the timing of their arrival times at laboratory location A, for example, so that the area around the laboratory task agent receiving the tool and material does not become congested.

Figure 2D:
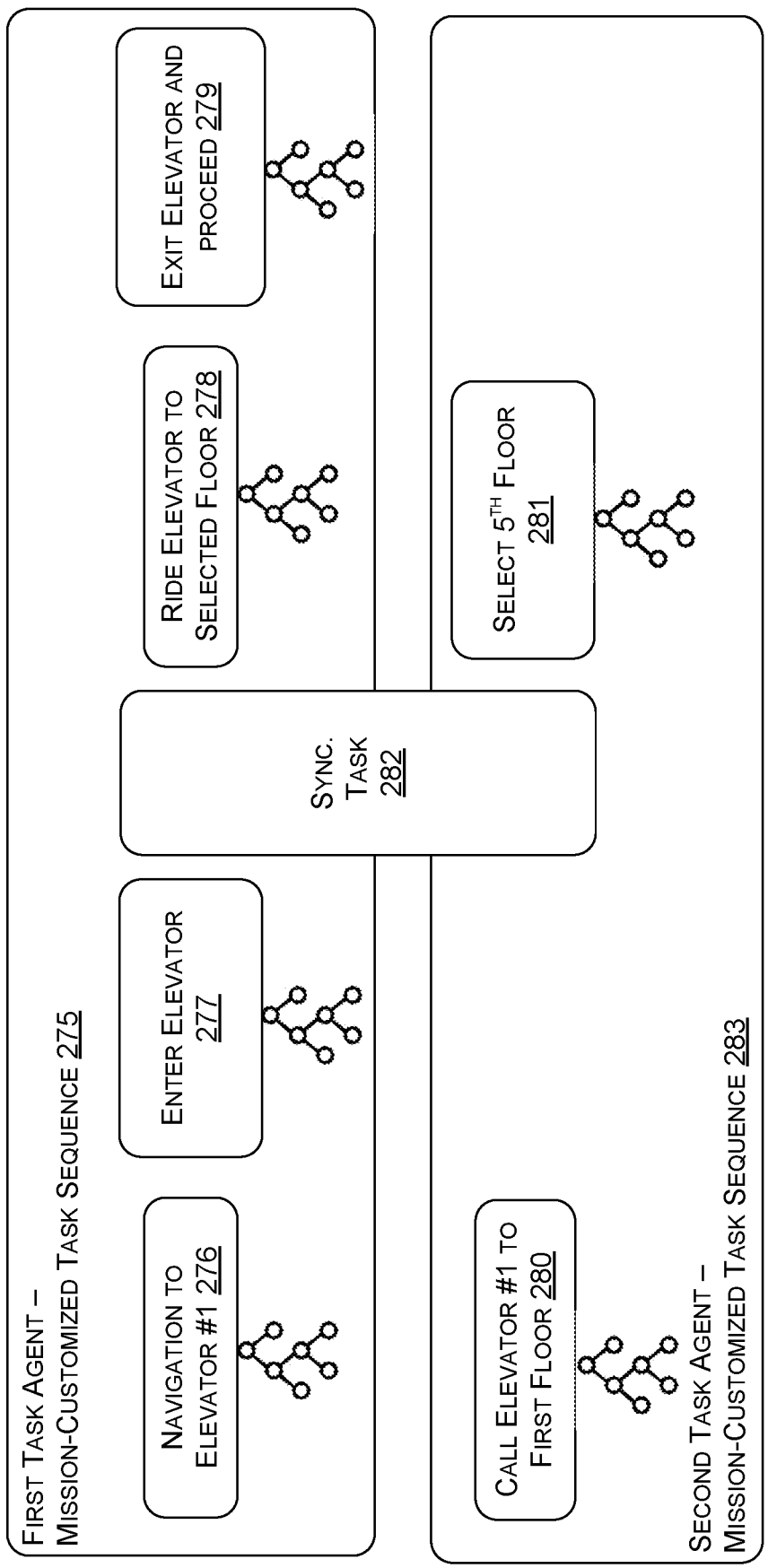
FIG. 2D is a diagram illustrating synchronization between mission-customized task sequences, in accordance with some embodiments of the present disclosure.

Referring now to FIG. 2D, FIG. 2D illustrates another example of synchronizing mission-customized task sequences. In this example, mission-customized task sequence 275 has been generated for mobile autonomous machine agent 170 to ride an elevator. Mission-customized task sequence 283 has been generated for a second task agent defined by the mission controller 120 that represents the elevator. For example, the mission controller 120 may execute a proxy representation of the customized behavior models of the mission-customized task sequence 283, and operate the elevator based on the mission-customized task sequence 283, for example, via an elevator system API. Here, the mission-customized task sequence 275 includes a first customized behavior model 276 directing the mobile autonomous machine agent 170 to navigate to elevator #1 (and which may further indicate a location of elevator #1). The mission controller 120 may monitor the progress of the mobile autonomous machine agent 170 in performing the behavior model 276 (e.g., using feedback data) and when the mobile autonomous machine agent 170 arrives within a proximity of elevator #1, the mission controller 120 executes customized behavior model 280 to call the elevator #1 (via the elevator system API) to the first floor where the mobile autonomous machine agent 170 is currently located. When the elevator doors open on the first floor, the mobile autonomous machine agent 170 may perform custom behavior model 277 to enter the elevator 277. The synchronization task 282 may be inserted within the mission-customized task sequences 275 and 283 to ensure that the mobile autonomous machine agent 170 confirms to the mission controller 120 that it has successfully entered elevator #1 before the mission controller 120 proceeds with executing custom behavior model 281 to select a destination floor, such as the $5^{th}$ floor (via the elevator system API). While in the elevator, the mobile autonomous machine agent 170 performs custom behavior model 278 to ride the elevator until the elevator doors open on the selected destination floor. The mobile autonomous machine agent 170 may then perform custom behavior model 279 to exit the elevator and proceed, for example, to a destination location as directed by another behavior model.

Figure 2E:
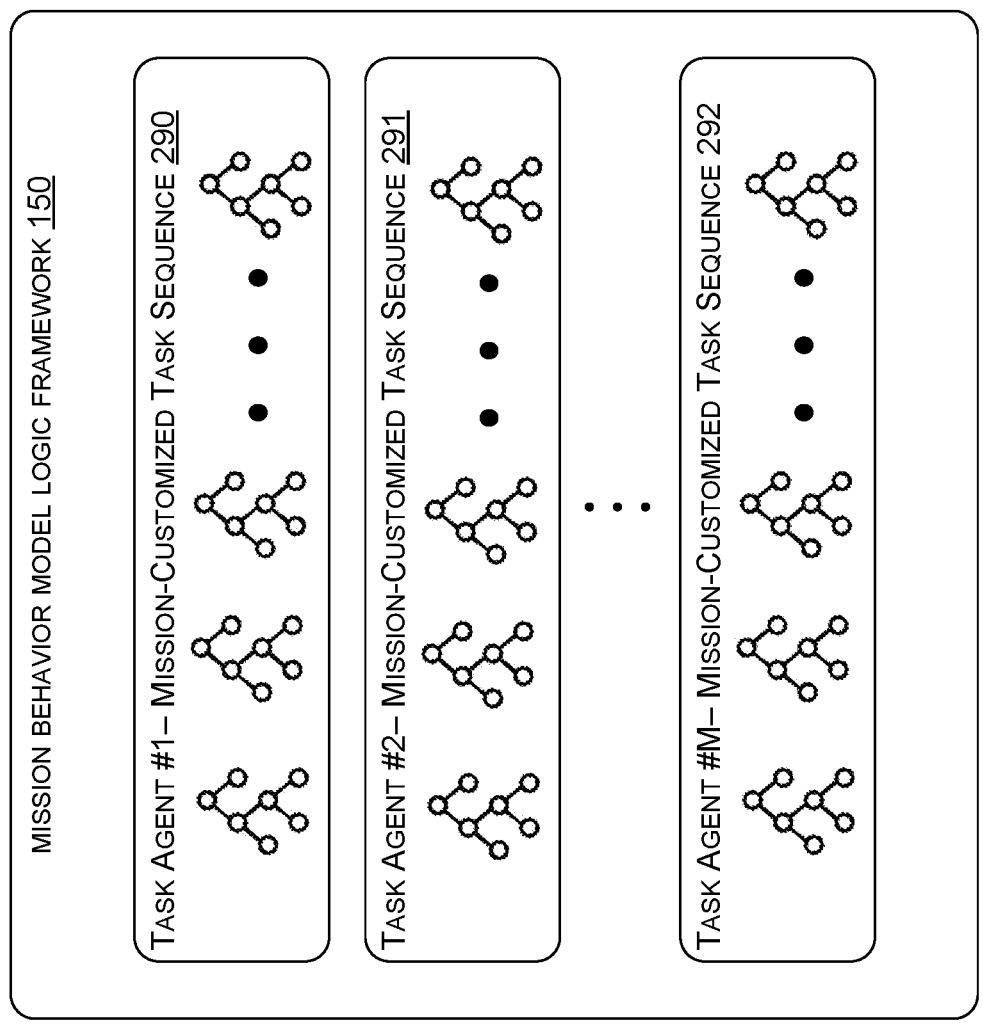
FIG. 2E is a diagram illustrating assembly of an example mission behavior model logic framework from one or more mission-customized task sequences, in accordance with some embodiments of the present disclosure.

Referring now to FIG. 2E, FIG. 2E illustrates the assembly of a mission behavior model logic framework 150 which may be assembled by the customized behavior model sequencing 144 of the mission instance assembly function 132 from one or more mission-customized task sequences (290, 291, and 292) generated, for example, as described above. Once generated, the mission behavior model logic framework 150 may be assigned a unique mission identifier (e.g., a Universal Unique Identifier (UUID)). As shown in FIG. 1, the assembled mission behavior model logic framework 150 may be stored to a persistent data store 162 (e.g., a database). The mission behavior model logic framework 150 may be queued in the persistent data store 162 until task agent resources are available to execute the mission instance. When the resources are available to perform the mission behavior model logic framework 150, it may be processed by the mission dispatch 160 to distribute segments of the mission behavior model logic framework 150 to the mobile autonomous machine agent(s) 170 specified by the mission behavior model logic framework 150. In some embodiments, the mission dispatch 160 may distribute to each mobile autonomous machine agent(s) 170 the one or more segments of the mission behavior model logic framework 150 corresponding to the respective specific local tasks assigned to those mobile autonomous machine agent(s) 170.

Figure 3:
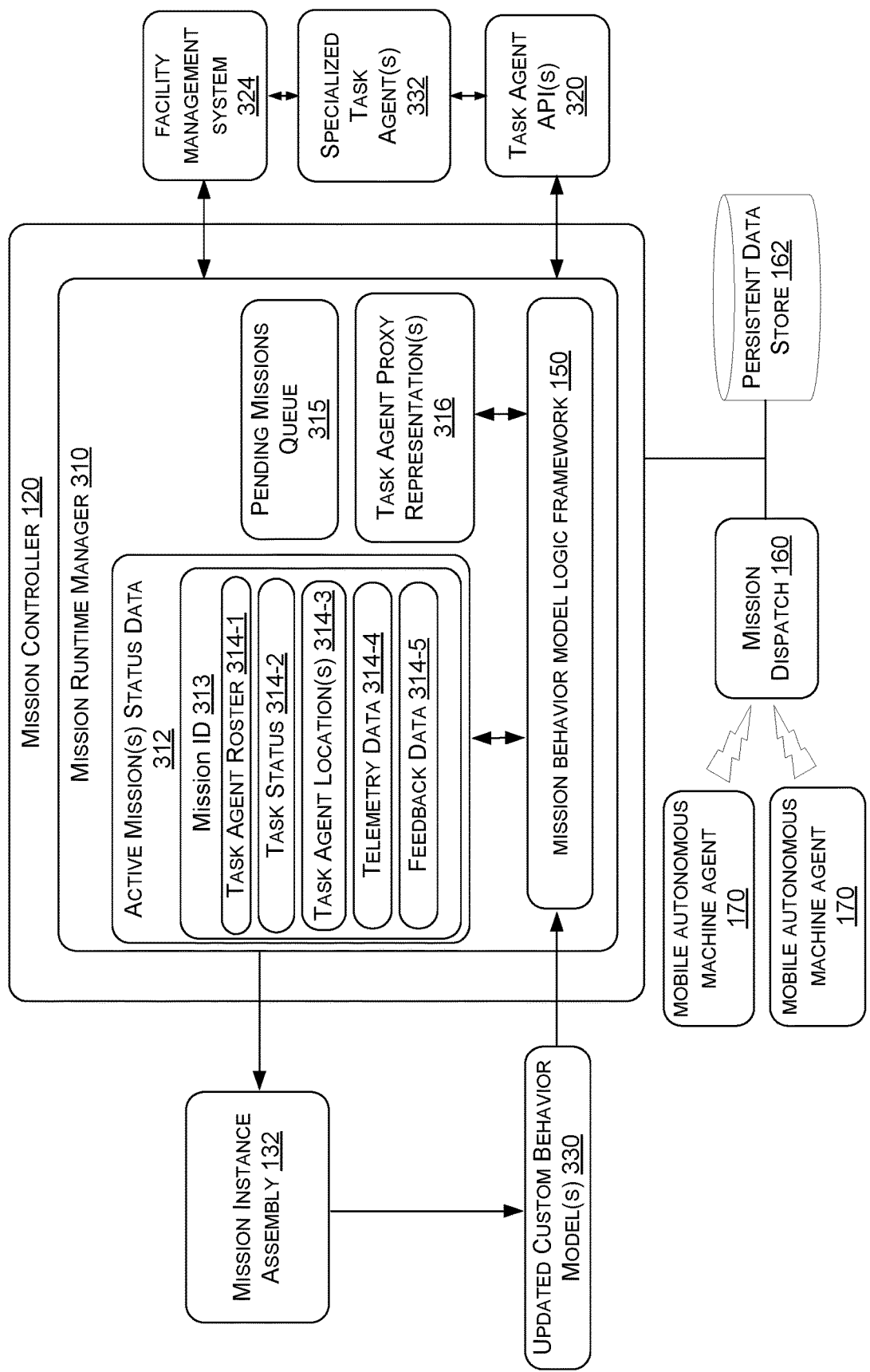
FIG. 3 is a data flow diagram for a system for a mission runtime manager component of a mission controller, in accordance with some embodiments of the present disclosure.

Referring now to FIG. 3, FIG. 3 illustrates a mission runtime manager 310 component of the mission controller 120 that may manage execution of one or more active mission instances based on one or more assembled mission behavior model frameworks 150. As shown in FIG. 3, the mission runtime manager 310 may maintain active mission status data 312 for one or more active mission instances currently in progress. Data for an active mission instance may be referenced from the active mission status data 312 using the mission ID 313 assigned to that mission instance. Information included in the active mission status data 312 for a mission instance may include, but is not limited to, a task agent roster 314-1 (e.g., a roster of one or more of the task agents contributing to a mission instance), a task status 314-2 (e.g., indications of local tasks and/or other milestones of a mission instance that have been completed, are in-progress, or have yet to commence), task agent location(s) 314-3 (e.g., the location of mobile autonomous machine agents 170 assigned to the mission instance), telemetry data 314-4 (e.g., task agent sensor data from environmental sensors, imaging sensors, audio sensors, localization sensors, task agent status codes, or any other data collected by a task agent), or other feedback data 314-5. For example, data reported back to the mission controller 120 from task agents performing a mission instance may include an indication of the mission ID 313, which may be used by the mission runtime manager 310 to manage the active mission status data 312 for that mission instance. In some embodiments, the mission runtime manager 310 may maintain a pending missions queue 315 that includes the mission ID of mission instances with already assembled mission behavior model frameworks that are awaiting execution. For example, in some embodiments, the mission controller 120 may schedule execution of mission instances based on resource availability and/or based on specific timing requests indicated in a mission request 105.

As previously discussed, for a given mission instance, one or more of the task agents may not directly execute a behavior model. For task agents that may not directly execute a behavior model, the mission runtime manager 310 of the mission controller 120 may execute one or more task agent proxy representations 316 of the behavior model(s) to represent an estimated state of such task agents as the mission instance is executed. In some embodiments, the mission runtime manager 310 may track and/or control a task agent through a task agent proxy representation 316 associated with that task agent. For example, in one or more embodiments, the mission runtime manager 310 may operate and/or monitor one or more specialized task agents 332 (e.g., an elevator, automated door, and/or other task agents that do not receive a segment of the mission behavior model logic framework 150) though a facility management system 324 and/or through a task agent API 320. The mission runtime manager 310 may operate such specialized task agents 332 based on behaviors defined for them by the mission behavior model logic framework 150 using the task agent proxy representations 316 to simulate the execution of the behavior models for those specialized task agents 332.

In some embodiments, the mission runtime manager 310 may determine from feedback data and/or other active mission status data 312 that an anomaly has occurred affecting one or more task agents during the execution of a mission instance. An anomaly may occur, for example, when a local task being performed by a task agent is delayed beyond an acceptance threshold and/or fails to be successfully performed to completion. In response, the mission runtime manager 310 may evaluate one or more contingency options and control the mission instance assembly function 132 to regenerate custom behavior models for that task agent to carry out the contingency. In some embodiments, the task library 134 may include one or more tasks specifically designated as contingency tasks with behavior models designed for contingency scenarios. The mission instance assembly function 132 may generate one or more updated custom behavior model(s) 330 that are used to update the mission behavior model logic framework 150 to control the affected task agent(s) to carry out the contingency. The mission dispatch may receive the updated mission behavior model logic framework 150 and transmit updated segments with the updated behavior models to the affected autonomous mobile task agents to replace the prior behavior models.

Figure 4:
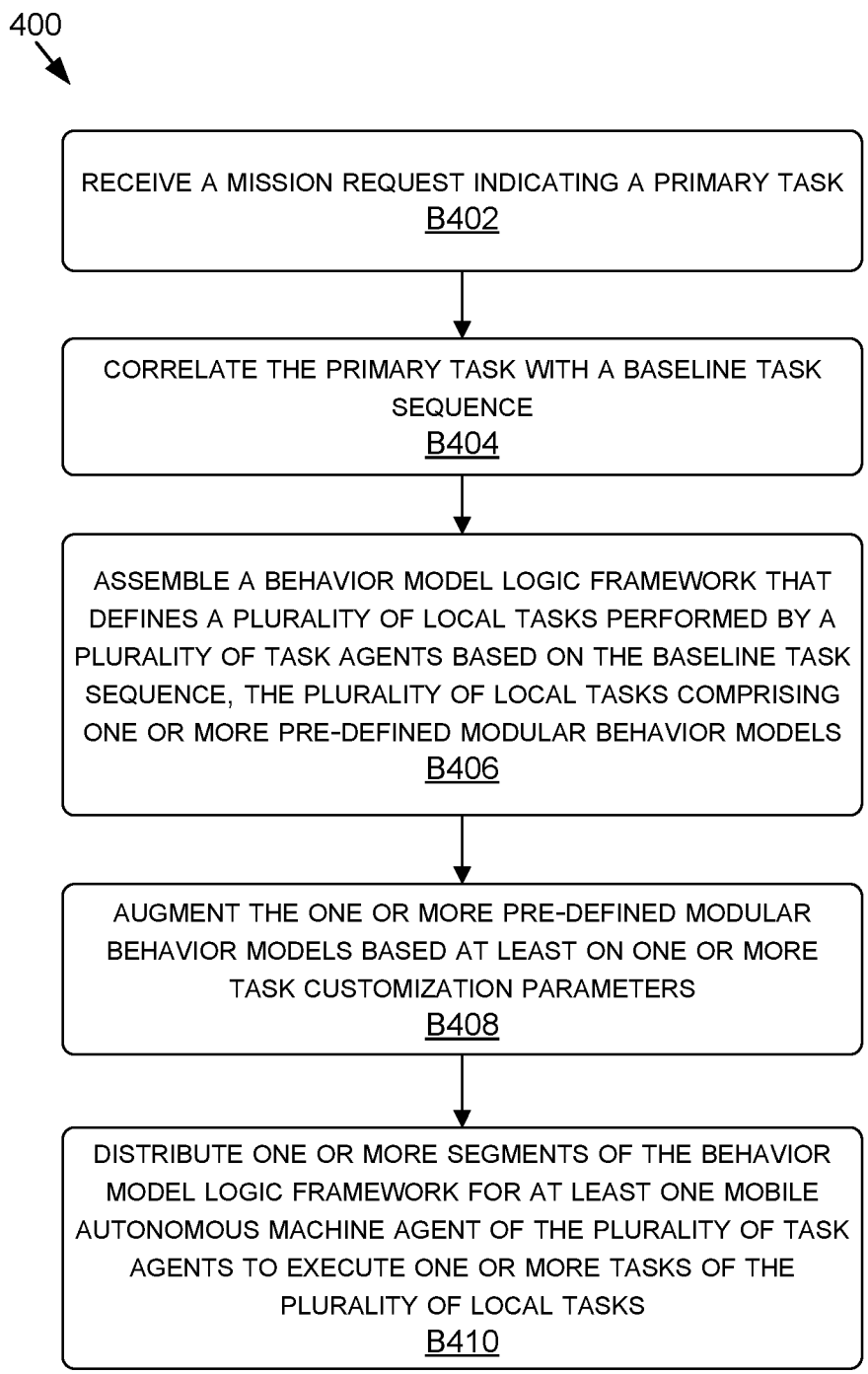
FIG. 4 is a flow chart illustrating a method for behavior-based mission task agent management, in accordance with some embodiments of the present disclosure.

Now referring to FIG. 4, FIG. 4 is a flow diagram showing a method 400 for behavior-based mission task agent management, in accordance with some embodiments of the present disclosure. It should be understood that the features and elements described herein with respect to the method 400 of FIG. 4 may be used in conjunction with, in combination with, or substituted for elements of, any of the other embodiments discussed herein and vice versa. Further, it should be understood that the functions, structures, and other descriptions of elements for embodiments described in FIG. 4 may apply to like or similarly named or described elements across any of the figures and/or embodiments described herein and vice versa.

Each block of method 400, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (stand-alone or in combination with another hosted service), or a plug-in to another product, to name a few. In addition, method 400 is described, by way of example, with respect to the behavior-based mission task management system 100 of FIG. 1. However, these methods may additionally or alternatively be executed by any one system, or any combination of systems, including, but not limited to, those described herein.

As discussed herein in greater detail, the method may include assembling a sequence of behavior models to generate a behavior model logic framework that defines a sequence of a plurality of local tasks performed by a plurality of task agents, and controlling an operation of at least one mobile autonomous machine agent of the plurality of task agents by distributing at least a segment of the behavior model logic framework to the at least one mobile autonomous machine agent.

The method 400, at block B402, includes receiving a mission request indicating a primary task. In some embodiments, a mission controller, such as the mission controller 120, may receive a mission request from a user that includes information defining a primary task to be performed by an autonomous system. The mission controller 120 may parse and/or infer primary task details from the mission request, for example, using natural language processing or another language model. In some embodiments, the mission controller 120 may parse the mission request to extract a primary task indication 124 (which may comprise, for example, a primary task classification) and/or one or more mission task customization parameters 126. The primary task may define an overall goal of mission request, where that primary task is completed through one or more local tasks performed by one or more task agents. The mission task customization parameters derived from a mission request may indicate user-specified substantive details used to customize a mission instance, such as, for example, identifying an item to be picked up and delivered, relevant locations where tasks are to be performed, types of sensor data to be collected, and/or otherwise specifying details regarding the actions and/or locations of local tasks involved in achieving the primary task.

The method 400, at block B404, includes correlating the primary task with a baseline task sequence. A baseline task sequence may specify a series of local tasks that when performed by one or more task agents complete the primary task requested by the mission request. In some embodiments, individual local tasks of the baseline task sequence may include pre-defined modular models that specify a plan of execution in terms of task agent behaviors to accomplish the individual local tasks. The baseline task sequence may include behavior models that may be assigned task agents including mobile autonomous machine agents, specialized task agents, and/or non-operative task agents. In some embodiments, baseline task sequence may include behavior models that represent actions taken by task agents such as people and/or animals as part of completing a mission.

The method 400, at block B406, includes assembling a behavior model logic framework that defines a plurality of local tasks performed by a plurality of task agents based on the baseline task sequence, the plurality of local tasks comprising one or more pre-defined modular behavior models. In some embodiments, the mission controller 120 may generate a mission behavior model logic framework for a mission instance that accounts for the actions of the plurality of task agents that play a role in completing the overall mission. The mission controller 120 breaks down a mission into a series of behavior-based sequences that are defined by the mission behavior model logic framework for tasks performed by each of the task agents. A mission behavior model logic framework may include synchronization points to coordinate the behaviors of individual task agents. A behavior model may comprise a behavior tree that includes logic to control switching between sequences of behaviors.

The mission behavior model logic framework includes the task sequences for the individual task agents and their corresponding customized behavior models, and thus provides a holistic representation of each of the individual task agents involved in completing the mission, including interactions and synchronizations between those task agents. The mission behavior model logic framework includes the customized behavior models that may be distributed to task agents for execution and/or implemented via proxy representations of behavior models by the mission controller itself to complete performance of the primary task(s) represented by the mission request.

The method 400, at block B408, includes augmenting the one or more pre-defined modular behavior models based at least on one or more task customization parameters. For example, the mission controller 120 may obtain a pre-defined baseline behavior model that it augments with additional behavior models as a function of the mission task customization parameters to generate the custom behavior models. The one or more pre-defined modular behavior models may be augmented based on mission task customization parameters from the mission request, and/or mission task customization parameters generated to accommodate en route actions for the given mission request. For example, the method may include a navigation routing function augmenting the one or more pre-defined modular behavior models based on at least one navigation route for a mobile autonomous machine agent, where the navigation route is derived based at least on the mission request. The navigation routing function may compute at least one navigation route for a mobile autonomous machine agent based on the mission request, and augment the one or more pre-defined modular behavior models based on the navigation route.

The method 400, at block B410, includes distributing one or more segments of the behavior model logic framework for at least one mobile autonomous machine agent of the plurality of task agents to execute one or more tasks of the plurality of local tasks. In some embodiments, the mission controller 120 may push, or otherwise provide, the mission behavior model logic framework, or one or more segments thereof, to a mission dispatch function, such as mission dispatch function 160. The mission dispatch function 160 may manage communications between the mission controller 120 and the autonomous mobile task agent(s) 170, and may distribute the segments of the mission behavior model logic framework to the one or more autonomous mobile task agents 170 identified in the mission behavior model logic framework. The individual autonomous mobile task agents 170 may then proceed to execute their assigned portions of local task sequences in accordance with the customized behavior models distributed to them by the mission dispatch function 160. In some embodiments, the dispatch function communicates with mobile autonomous machine agents via a wireless communication link. The method may include distributing a first segment of the one or more segments of the mission behavior model logic framework to a first mobile autonomous machine agent to execute a first set of the one or more tasks of the plurality of local tasks, and distributing a second segment of the one or more segments of the mission behavior model logic framework to a second mobile autonomous machine agent to execute a second set of the one or more tasks of the plurality of local tasks. The one or more segments of the mission behavior model logic framework may comprise at least one modular behavior model that instructs the at least one mobile autonomous machine agent to synchronize an action with at least one other task agent of the plurality of task agents to execute the one or more tasks of the plurality of local tasks.

In some embodiments, the method may include executing a proxy representation of a first behavior model of the one or more pre-defined modular behavior models to represent an estimated state of a first task agent of the plurality of task agents that does not receive and/or execute the first behavior model. For example, in such an embodiment, the first task agent may comprise a specialized task agent that is operated based on the first behavior model using commands communicated by the mission controller 120 to an application programming interface (API).

In some embodiments, the mission controller 120 may assign a mission identifier (mission ID) to the mission behavior model logic framework. The mission controller 120 may include a mission runtime manager 310 that during runtime of a mission instance, tracks a status of the plurality of task agents based at least on the mission identifier. The mission behavior model logic framework may be updated during runtime of a mission instance based on feedback data from one or more of the plurality of task agents. Updated segments of the mission behavior model logic framework may be generated and distributed to at least one mobile autonomous machine agent of the plurality of task agents.

Figure 5:
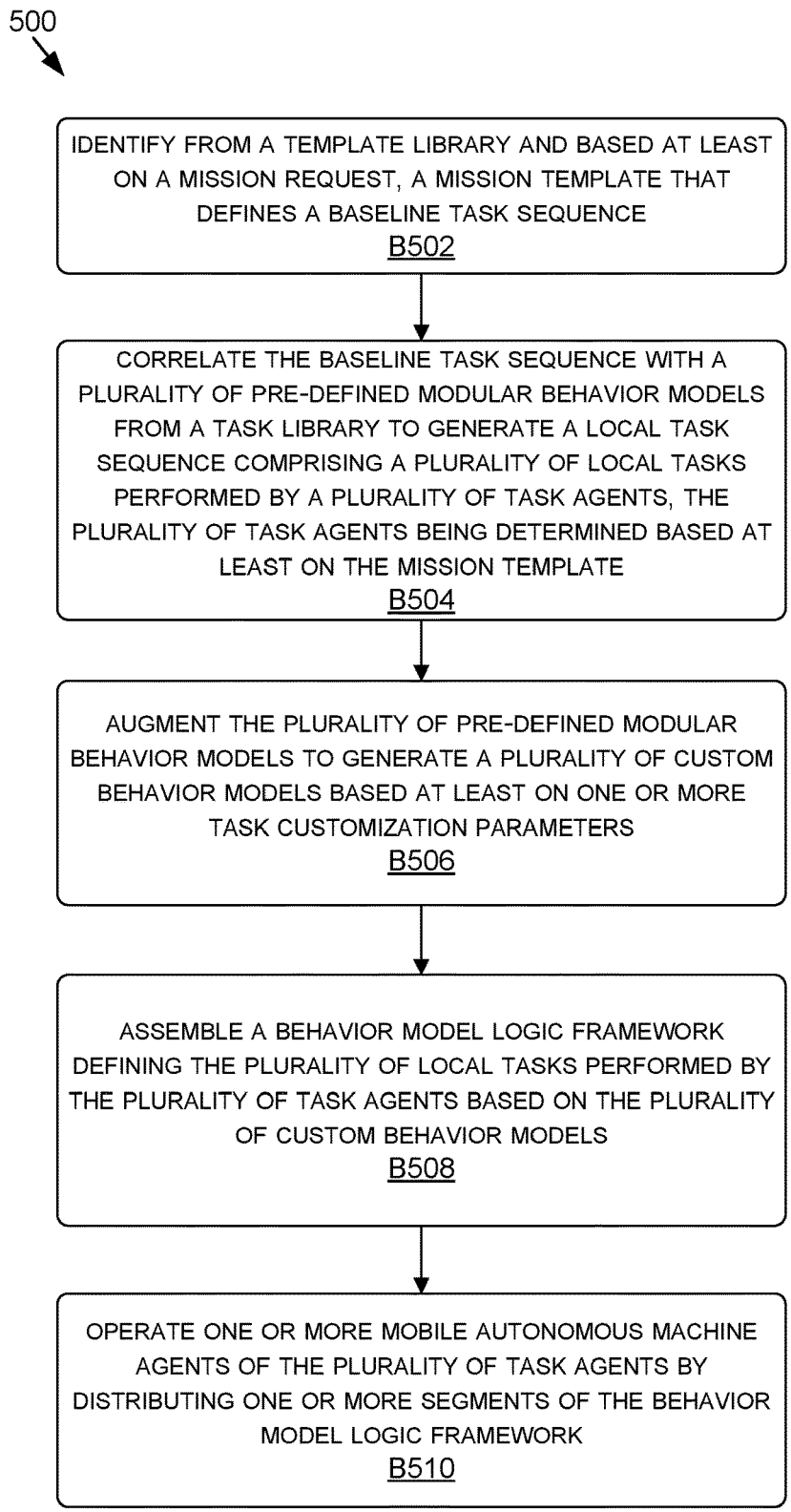
FIG. 5 is a flow chart illustrating a method for autonomous management using behavior-based mission templates, in accordance with some embodiments of the present disclosure.

Now referring to FIG. 5, FIG. 5 is a flow diagram showing a method 500 for autonomous management using behavior-based mission templates, in accordance with some embodiments of the present disclosure. It should be understood that the features and elements described herein with respect to the method 500 of FIG. 5 may be used in conjunction with, in combination with, or substituted for elements of, any of the other embodiments discussed herein and vice versa. Further, it should be understood that the functions, structures, and other descriptions of elements for embodiments described in FIG. 5 may apply to like or similarly named or described elements across any of the figures and/or embodiments described herein and vice versa.

Each block of method 500, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, method 500 is described, by way of example, with respect to the behavior-based mission task management system 100 of FIG. 1. However, these methods may additionally or alternatively be executed by any one system, or any combination of systems, including, but not limited to, those described herein.

As discussed herein in greater detail, the method may include assembling a mission framework comprising a plurality of custom behavior models for operating a plurality of task agents based at least on generating a baseline task sequence using a mission template, correlating the baseline task sequence with a plurality of customizable behavior models from a task library, augmenting the plurality of customizable behavior models to generate the plurality of custom behavior models, and operating one or more mobile autonomous machine agents of the plurality of task agents based at least on distributing one or more segments of the mission framework to at least one of the one or more mobile autonomous machine agents or one or more task agents of the plurality of task agents.

The method 500, at block B502, includes identifying from a template library and based at least on a mission request, a mission template that defines a baseline task sequence. A mission template may comprise a baseline task sequence that specifies series of local tasks that, when performed by one or more task agents complete the primary task requested by the mission request. In some embodiments, individual local tasks of the baseline task sequence may include pre-defined modular models that specify a plan of execution in terms of task agent behaviors to accomplish the individual local tasks. The baseline task sequence may include behavior models that may be assigned task agents including mobile autonomous machine agents, specialized task agents, and/or non-operative task agents. A baseline task sequence may include behavior models that represent actions taken by task agents such as people and/or animals as part of completing a mission. The mission template may define the baseline task sequence using a data format that comprises one or more of a JavaScript Object Notation (JSON) or a natural language description.

In some embodiments, a mission template for a primary task that uses more than one autonomous mobile task agent may indicate the number of autonomous mobile task agents to be used for completing the mission, and the baseline task sequence can include task sequences for each of those autonomous mobile task agents. The baseline task sequence may also include synchronization tasks, as needed, to coordinate actions between multiple task agents. In some embodiments, the mission template may further include a specification that indicates one or more criteria that define minimum capabilities for the individual task agents to be assigned to perform a task sequence.

In some embodiments, a mission controller, such as the mission controller 120, may receive the mission request input from a user that includes information defining a primary task to be performed by an autonomous system. The mission controller 120 may parse and/or infer primary task details from the mission request, for example, using natural language processing or another language model. In some embodiments, the mission controller 120 may parse the mission request to extract a primary task indication 124 (which may comprise, for example, a primary task classification) and/or one or more mission task customization parameters 126. The primary task may define an overall goal of mission request, where that primary task is completed through one or more local tasks performed by one or more task agents. The mission task customization parameters derived from a mission request may indicate user-specified substantive details used to customize a mission instance, such as, for example, identifying an item to be picked up and delivered, relevant locations where tasks are to be performed, types of sensor data to be collected, and/or otherwise specifying details regarding the actions and/or locations of local tasks involved in achieving the primary task.

The method 500, at block B504, includes correlating the baseline task sequence with a plurality of pre-defined modular behavior models from a task library to generate a local task sequence comprising a plurality of local tasks performed by a plurality of task agents. The plurality of task agents may be determined based at least on the mission template. The baseline task sequence may include pre-defined modular behavior models corresponding to actions performed by task agents including mobile autonomous machine agents, specialized task agents, and/or non-operative task agents. A behavior model may comprise a behavior tree that includes logic to control switching between sequences of behaviors. Example task agents include, but are not limited to, an autonomous robot, an autonomous mobile machine, an ego vehicle, an ego machine, an automated door, an elevator, a transport platform, a facility management system, a mechanical tool, an electrical tool, a sensor device, a container, or a composition of matter. In some embodiments, baseline task sequence may include behavior models that represent actions taken by task agents such as people and/or animals as part of completing a mission.

The method 500, at block B506, includes augmenting the plurality of pre-defined modular behavior models to generate a plurality of custom behavior models based at least on one or more task customization parameters. For each behavior model retrieved from the task library, the mission controller may customize the behavior model based on the mission task customization parameters to generate custom behavior models specific for the given mission request. For example, the mission task customization parameters may specify the item being requested, the location to which it should be delivered, and/or other parameters, such as a desired time of delivery. This information may be used to customize the behavior models of the individual task agents involved in each mission instance.

For example, the mission controller 120 may obtain from the task library pre-defined baseline behavior model that it augments with additional behavior models as a function of the mission task customization parameters to generate custom behavior models. The one or more pre-defined modular behavior models may be augmented based on mission task customization parameters from the mission request and/or mission task customization parameters generated to accommodate en route actions for the given mission request. For example, the method may include a navigation routing function augmenting the one or more pre-defined modular behavior models based on at least one navigation route for a mobile autonomous machine agent, where the navigation route is derived based at least on the mission request. The navigation routing function may compute at least one navigation route for a mobile autonomous machine agent based on the mission request and augment the one or more pre-defined modular behavior models based on the navigation route. In some embodiments, mission task customization parameters for performing en route actions may be determined based at least on a facility map.

The method 500, at block B508, includes assembling a behavior model logic framework defining the plurality of local tasks performed by the plurality of task agents based on the plurality of custom behavior models. The mission behavior model logic framework includes the customized behavior models that may be distributed to task agents for execution, and/or implemented via proxy representations of behavior models by the mission controller itself, to complete performance of the primary task(s) represented by the mission request. In some embodiments, the mission controller 120 may generate a mission behavior model logic framework for a mission instance that accounts for the actions of the plurality of task agents that play a role in completing the overall mission. The mission controller 120 breaks down a mission into a series of behavior-based sequences that are defined by the mission behavior model logic framework for tasks performed by each of the task agents. A mission behavior model logic framework may include synchronization points to coordinate the behaviors of individual task agents.

The method 500, at block B510, includes operating one or more mobile autonomous machine agents of the plurality of task agents by distributing one or more segments of the behavior model logic framework. In some embodiments, the mission controller 120 may push, or otherwise provide, the mission behavior model logic framework, or one or more segments thereof, to a mission dispatch function, such as mission dispatch function 160. As discussed herein, the mission dispatch function 160 may manage communications between the mission controller 120 and the autonomous mobile task agent(s) 170, and may distribute the segments of the mission behavior model logic framework to the one or more autonomous mobile task agents 170 identified in the mission behavior model logic framework. The individual autonomous mobile task agents 170 may then proceed to execute their assigned portions of local task sequences in accordance with the customized behavior models distributed to them by the mission dispatch function 160.

In some embodiments, the method may include executing a proxy representation of a first behavior model to represent an estimated state of a first task agent of the plurality of task agents that does not receive and/or execute the first behavior model. For example, in such an embodiment, the first task agent may comprise a specialized task agent that is operated based on the first behavior model using commands communicated by the mission controller 120 to an application programming interface (API) or a non-operative task agent.

In some embodiments, the mission controller 120 may determine (e.g., from feedback data and/or other active mission status data 312) an anomaly has occurred affecting one or more task agents during the execution of a mission instance. In response, the method may include regenerating custom behavior models for that task agent to carry out a contingency. For example, in some embodiments, the task library may include one or more tasks specifically designated as contingency tasks with behavior models designed for contingency scenarios. The method may generate the updated custom behavior model(s) that are used to update the mission behavior model logic framework to control the affected task agent(s), and re-assemble the mission behavior model logic framework based on the one or more updated custom behavior models to carry out the contingency. The mission dispatch may receive the updated mission behavior model logic framework and transmit updated segments with the updated behavior models to the affected autonomous mobile task agents to replace the prior behavior models.

In some embodiments, a facility operator may generate their own mission templates and/or behavior models and load them into the mission template library and/or task library for their facility. For example, the set of pre-defined modular behavior models in the task library may be updated based at least in part on one or more of the plurality of custom behavior models (e.g., to include an instance of a frequently used customized behavior model). The mission template library may be updated based on updates to the task library (e.g., to generate a new mission template for a baseline task sequence that includes a new behavior model added to the task library). In some embodiments, mission templates may be updated to reflect changes to classes of task agents available at a facility where missions are performed. For example, the mission templates in a mission template library may be updated to include baseline task sequences that incorporate capabilities of new or different task agents deployed to the facility.

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation, autonomous or semi-autonomous machine applications, deep learning, environment simulation, object or actor simulation and/or digital twinning, data center processing, conversational AI, generative AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing generative AI operations using a language model—such as a large language model (LLM), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

Example Autonomous Vehicle

Figure 6A:
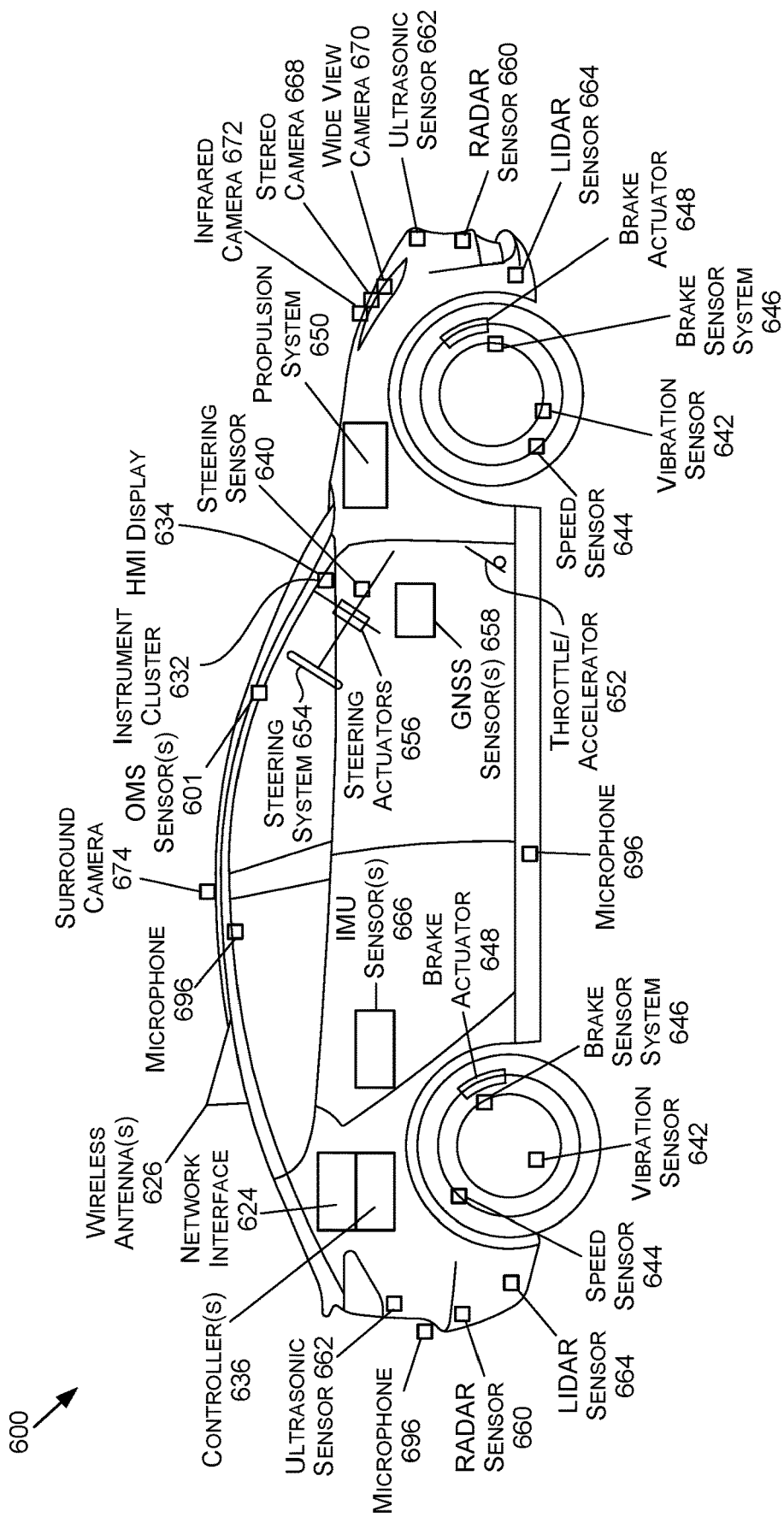
FIG. 6A is an illustration of an example autonomous vehicle, in accordance with some embodiments of the present disclosure.

FIG. 6A is an illustration of an example autonomous vehicle 600, in accordance with some embodiments of the present disclosure. The autonomous vehicle 600 (alternatively referred to herein as the "vehicle 600") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 600 may be capable of functionality in accordance with one or more of Level 3-Level 5 of the autonomous driving levels. The vehicle 600 may be capable of functionality in accordance with one or more of Level 1-Level 5 of the autonomous driving levels. For example, the vehicle 600 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 600 or other machine, such as being fully autonomous, being highly autonomous, being conditionally autonomous, being partially autonomous, providing assistive autonomy, being semi-autonomous, being primarily autonomous, or other designation.

The vehicle 600 may include components such as a chassis, a vehicle body, wheels (e.g., 2, 4, 6, 8, 18, etc.), tires, axles, and other components of a vehicle. The vehicle 600 may include a propulsion system 650, such as an internal combustion engine, hybrid electric power plant, an all-electric engine, and/or another propulsion system type. The propulsion system 650 may be connected to a drive train of the vehicle 600, which may include a transmission, to enable the propulsion of the vehicle 600. The propulsion system 650 may be controlled in response to receiving signals from the throttle/accelerator 652.

A steering system 654, which may include a steering wheel, may be used to steer the vehicle 600 (e.g., along a desired path or route) when the propulsion system 650 is operating (e.g., when the vehicle is in motion). The steering system 654 may receive signals from a steering actuator 656. The steering wheel may be optional for full automation (Level 5) functionality.

The brake sensor system 646 may be used to operate the vehicle brakes in response to receiving signals from the brake actuators 648 and/or brake sensors.

Controller(s) 636, which may include one or more system on chips (SoCs) 604 (FIG. 6C) and/or GPU(s), may provide signals (e.g., representative of commands) to one or more components and/or systems of the vehicle 600. For example, the controller(s) may send signals to operate the vehicle brakes via one or more brake actuators 648, to operate the steering system 654 via one or more steering actuators 656, to operate the propulsion system 650 via one or more throttle/accelerators 652. The controller(s) 636 may include one or more onboard (e.g., integrated) computing devices (e.g., supercomputers) that process sensor signals, and output operation commands (e.g., signals representing commands) to enable autonomous driving and/or to assist a human driver in driving the vehicle 600. The controller(s) 636 may include a first controller 636 for autonomous driving functions, a second controller 636 for functional safety functions, a third controller 636 for artificial intelligence functionality (e.g., computer vision), a fourth controller 636 for infotainment functionality, a fifth controller 636 for redundancy in emergency conditions, and/or other controllers. In some examples, a single controller 636 may handle two or more of the above functionalities, two or more controllers 636 may handle a single functionality, and/or any combination thereof. In some embodiments, controllers 636 may execute algorithms for operating components of the vehicle 600 based on behavior models of the mission behavior model logic framework distributed to the vehicle 600.

The controller(s) 636 may provide the signals for controlling one or more components and/or systems of the vehicle 600 in response to sensor data received from one or more sensors (e.g., sensor inputs). The sensor data may be received from, for example and without limitation, global navigation satellite systems ("GNSS") sensor(s) 658 (e.g., Global Positioning System sensor(s)), RADAR sensor(s) 660, ultrasonic sensor(s) 662, LIDAR sensor(s) 664, inertial measurement unit (IMU) sensor(s) 666 (e.g., accelerometer(s), gyroscope(s), magnetic compass(es), magnetometer(s), etc.), microphone(s) 696, stereo camera(s) 668, wide-view camera(s) 670 (e.g., fisheye cameras), infrared camera(s) 672, surround camera(s) 674 (e.g., 360 degree cameras), long-range and/or mid-range camera(s) 698, speed sensor(s) 644 (e.g., for measuring the speed of the vehicle 600), vibration sensor(s) 642, steering sensor(s) 640, brake sensor(s) (e.g., as part of the brake sensor system 646), one or more occupant monitoring system (OMS) sensor(s) 601 (e.g., one or more interior cameras), and/or other sensor types.

One or more of the controller(s) 636 may receive inputs (e.g., represented by input data) from an instrument cluster 632 of the vehicle 600 and provide outputs (e.g., represented by output data, display data, etc.) via a human-machine interface (HMI) display 634, an audible annunciator, a loudspeaker, and/or via other components of the vehicle 600. The outputs may include information such as vehicle velocity, speed, time, map data (e.g., the High Definition ("HD") map 622 of FIG. 6C), location data (e.g., the vehicle's 600 location, such as on a map), direction, location of other vehicles (e.g., an occupancy grid), information about objects and status of objects as perceived by the controller(s) 636, etc. For example, the HMI display 634 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 600 further includes a network interface 624 which may use one or more wireless antenna(s) 626 and/or modem(s) to communicate over one or more networks. For example, the network interface 624 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 626 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc. In some embodiments, the mission dispatch 160 may establish a wireless communication link with the vehicle 600 via the network interface 624.

Figure 6B:
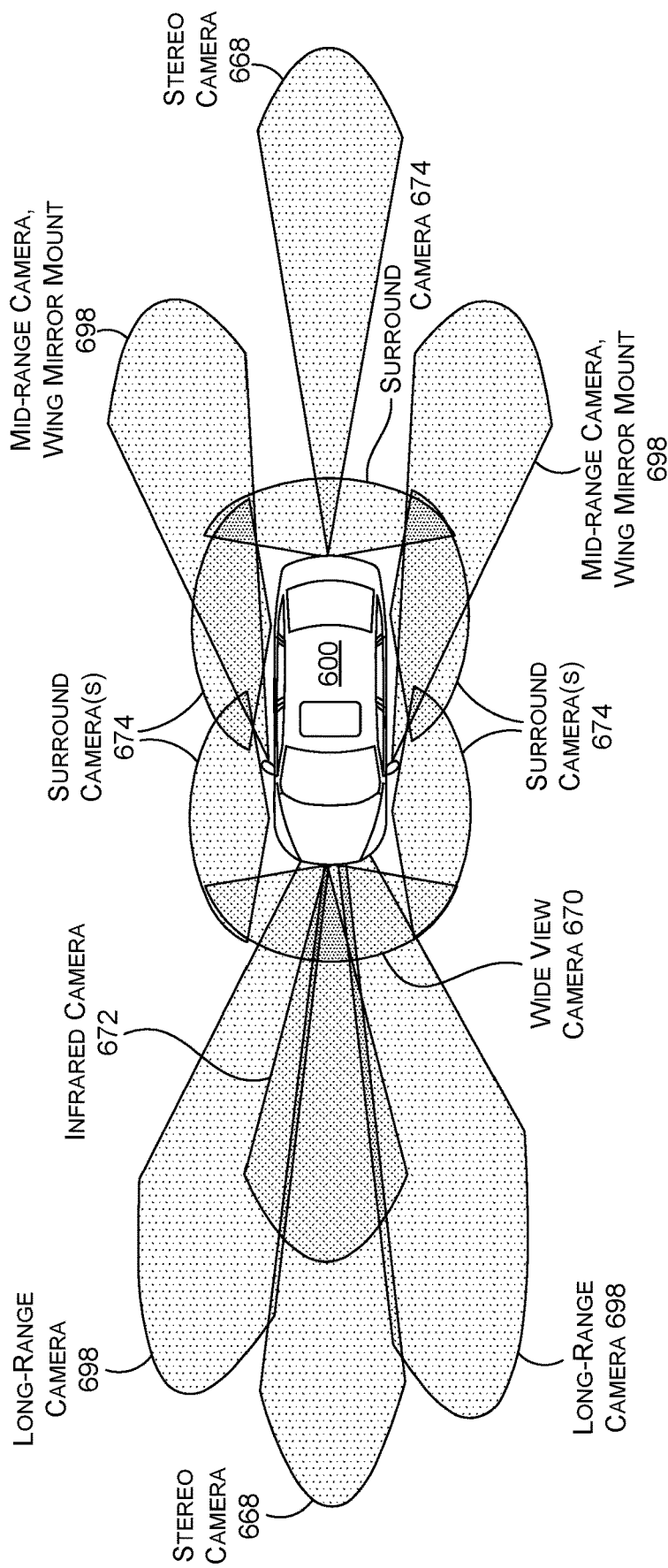
FIG. 6B is an example of camera locations and fields of view for the example autonomous vehicle of FIG. 6A, in accordance with some embodiments of the present disclosure.

FIG. 6B is an example of camera locations and fields of view for the example autonomous vehicle 600 of FIG. 6A, in accordance with some embodiments of the present disclosure. The cameras and respective fields of view are one example embodiment and are not intended to be limiting. For example, additional and/or alternative cameras may be included and/or the cameras may be located at different locations on the vehicle 600.

The camera types for the cameras may include, but are not limited to, digital cameras that may be adapted for use with the components and/or systems of the vehicle 600. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 600 (e.g., front-facing cameras) may be used for surround view, to help identify forward facing paths and obstacles, as well aid in, with the help of one or more controllers 636 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 670 that may be used to perceive objects coming into view from the periphery (e.g., pedestrians, crossing traffic or bicycles). Although only one wide-view camera is illustrated in FIG. 6B, there may be any number (including zero) of wide-view cameras 670 on the vehicle 600. In addition, any number of long-range camera(s) 698 (e.g., a long-view stereo camera pair) may be used for depth-based object detection, especially for objects for which a neural network has not yet been trained. The long-range camera(s) 698 may also be used for object detection and classification, as well as basic object tracking.

Any number of stereo cameras 668 may also be included in a front-facing configuration. In at least one embodiment, one or more of stereo camera(s) 668 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 668 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 668 may be used in addition to, or alternatively from, those described herein.

Cameras with a field of view that include portions of the environment to the side of the vehicle 600 (e.g., side-view cameras) may be used for surround view, providing information used to create and update the occupancy grid, as well as to generate side impact collision warnings. For example, surround camera(s) 674 (e.g., four surround cameras 674 as illustrated in FIG. 6B) may be positioned to on the vehicle 600. The surround camera(s) 674 may include wide-view camera(s) 670, fisheye camera(s), 360 degree camera(s), and/or the like. Four example, four fisheye cameras may be positioned on the vehicle's front, rear, and sides. In an alternative arrangement, the vehicle may use three surround camera(s) 674 (e.g., left, right, and rear), and may leverage one or more other camera(s) (e.g., a forward-facing camera) as a fourth surround view camera.

Cameras with a field of view that include portions of the environment to the rear of the vehicle 600 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 698, stereo camera(s) 668, infrared camera(s) 672, etc.), as described herein.

Cameras with a field of view that include portions of the interior environment within the cabin of the vehicle 600 (e.g., one or more OMS sensor(s) 601) may be used as part of an occupant monitoring system (OMS) such as, but not limited to, a driver monitoring system (DMS). For example, OMS sensors (e.g., the OMS sensor(s) 601) may be used (e.g., by the controller(s) 636) to track an occupant's and/or driver's gaze direction, head pose, and/or blinking. This gaze information may be used to determine a level of attentiveness of the occupant or driver (e.g., to detect drowsiness, fatigue, and/or distraction), and/or to take responsive action to prevent harm to the occupant or operator. In some embodiments, data from OMS sensors may be used to enable gaze-controlled operations triggered by driver and/or non-driver occupants such as, but not limited to, adjusting cabin temperature and/or airflow, opening and closing windows, controlling cabin lighting, controlling entertainment systems, adjusting mirrors, adjusting seat positions, and/or other operations. In some embodiments, an OMS may be used for applications such as determining when objects and/or occupants have been left behind in a vehicle cabin (e.g., by detecting occupant presence after the driver exits the vehicle).

Figure 6C:
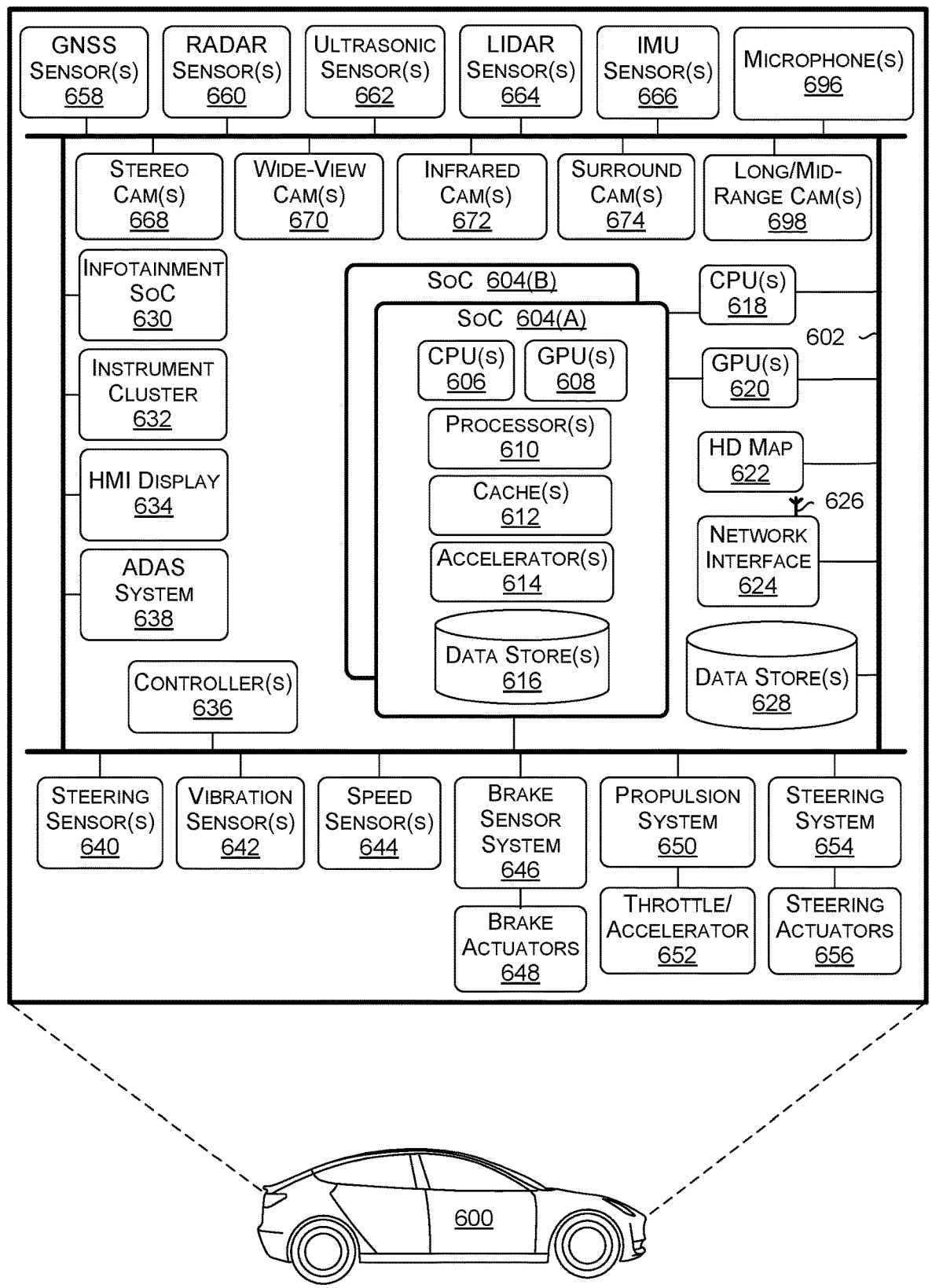
FIG. 6C is a block diagram of an example system architecture for the example autonomous vehicle of FIG. 6A, in accordance with some embodiments of the present disclosure.

FIG. 6C is a block diagram of an example system architecture for the example autonomous vehicle 600 of FIG. 6A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 600 in FIG. 6C are illustrated as being connected via bus 602. The bus 602 may include a Controller Area Network (CAN) data interface (alternatively referred to herein as a "CAN bus"). A CAN may be a network inside the vehicle 600 used to aid in control of various features and functionality of the vehicle 600, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 602 is described herein as being a CAN bus, this is not intended to be limiting. For example, in addition to, or alternatively from, the CAN bus, FlexRay and/or Ethernet may be used. Additionally, although a single line is used to represent the bus 602, this is not intended to be limiting. For example, there may be any number of busses 602, which may include one or more CAN busses, one or more FlexRay busses, one or more Ethernet busses, and/or one or more other types of busses using a different protocol. In some examples, two or more busses 602 may be used to perform different functions, and/or may be used for redundancy. For example, a first bus 602 may be used for collision avoidance functionality and a second bus 602 may be used for actuation control. In any example, each bus 602 may communicate with any of the components of the vehicle 600, and two or more busses 602 may communicate with the same components. In some examples, each SoC 604, each controller 636, and/or each computer within the vehicle may have access to the same input data (e.g., inputs from sensors of the vehicle 600), and may be connected to a common bus, such the CAN bus.

The vehicle 600 may include one or more controller(s) 636, such as those described herein with respect to FIG. 6A. The controller(s) 636 may be used for a variety of functions. The controller(s) 636 may be coupled to any of the various other components and systems of the vehicle 600, and may be used for control of the vehicle 600, artificial intelligence of the vehicle 600, infotainment for the vehicle 600, and/or the like.

The vehicle 600 may include a system(s) on a chip (SoC) 604. The SoC 604 may include CPU(s) 606, GPU(s) 608, processor(s) 610, cache(s) 612, accelerator(s) 614, data store(s) 616, and/or other components and features not illustrated. The SoC(s) 604 may be used to control the vehicle 600 in a variety of platforms and systems. For example, the SoC(s) 604 may be combined in a system (e.g., the system of the vehicle 600) with an HD map 622 which may obtain map refreshes and/or updates via a network interface 624 from one or more servers (e.g., server(s) 678 of FIG. 6D). In some embodiments, SoC 604 may execute algorithms for operating components of the vehicle 600 based on behavior models of the mission behavior model logic framework distributed to the vehicle 600.

The CPU(s) 606 may include a CPU cluster or CPU complex (alternatively referred to herein as a "CCPLEX"). The CPU(s) 606 may include multiple cores and/or L2 caches. For example, in some embodiments, the CPU(s) 606 may include eight cores in a coherent multi-processor configuration. In some embodiments, the CPU(s) 606 may include four dual-core clusters where each cluster has a dedicated L2 cache (e.g., a 2 MB L2 cache). The CPU(s) 606 (e.g., the CCPLEX) may be configured to support simultaneous cluster operation enabling any combination of the clusters of the CPU(s) 606 to be active at any given time.

The CPU(s) 606 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 606 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 608 may include an integrated GPU (alternatively referred to herein as an "iGPU"). The GPU(s) 608 may be programmable and may be efficient for parallel workloads. The GPU(s) 608, in some examples, may use an enhanced tensor instruction set. The GPU(s) 608 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 608 may include at least eight streaming microprocessors. The GPU(s) 608 may use compute application programming interface(s) (API(s)). In addition, the GPU(s) 608 may use one or more parallel computing platforms and/or programming models (e.g., NVIDIA's CUDA).

The GPU(s) 608 may be power-optimized for best performance in automotive and embedded use cases. For example, the GPU(s) 608 may be fabricated on a Fin field-effect transistor (FinFET). However, this is not intended to be limiting and the GPU(s) 608 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 608 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 608 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 608 to access the CPU(s) 606 page tables directly. In such examples, when the GPU(s) 608 memory management unit (MMU) experiences a miss, an address translation request may be transmitted to the CPU(s) 606. In response, the CPU(s) 606 may look in its page tables for the virtual-to-physical mapping for the address and transmits the translation back to the GPU(s) 608. As such, unified memory technology may allow a single unified virtual address space for memory of both the CPU(s) 606 and the GPU(s) 608, thereby simplifying the GPU(s) 608 programming and porting of applications to the GPU(s) 608.

In addition, the GPU(s) 608 may include an access counter that may keep track of the frequency of access of the GPU(s) 608 to memory of other processors. The access counter may help ensure that memory pages are moved to the physical memory of the processor that is accessing the pages most frequently.

The SoC(s) 604 may include any number of cache(s) 612, including those described herein. For example, the cache(s) 612 may include an L3 cache that is available to both the CPU(s) 606 and the GPU(s) 608 (e.g., that is connected both the CPU(s) 606 and the GPU(s) 608). The cache(s) 612 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 604 may include an arithmetic logic unit(s) (ALU(s)) which may be leveraged in performing processing with respect to any of the variety of tasks or operations of the vehicle 600—such as processing DNNs. In addition, the SoC(s) 604 may include a floating point unit(s) (FPU(s))—or other math coprocessor or numeric coprocessor types—for performing mathematical operations within the system. For example, the SoC(s) 604 may include one or more FPUs integrated as execution units within a CPU(s) 606 and/or GPU(s) 608.

The SoC(s) 604 may include one or more accelerators 614 (e.g., hardware accelerators, software accelerators, or a combination thereof). For example, the SoC(s) 604 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 608 and to off-load some of the tasks of the GPU(s) 608 (e.g., to free up more cycles of the GPU(s) 608 for performing other tasks). As an example, the accelerator(s) 614 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 614 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 608, and by using an inference accelerator, for example, a designer may target either the DLA(s) or the GPU(s) 608 for any function. For example, the designer may focus processing of CNNs and floating point operations on the DLA(s) and leave other functions to the GPU(s) 608 and/or other accelerator(s) 614.

The accelerator(s) 614 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 606. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 614 (e.g., the hardware acceleration cluster) may include a computer vision network on-chip and SRAM, for providing a high-bandwidth, low latency SRAM for the accelerator(s) 614. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 604 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 614 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g., from another subsystem), inertial measurement unit (IMU) sensor 666 output that correlates with the vehicle 600 orientation, distance, 3D location estimates of the object obtained from the neural network and/or other sensors (e.g., LIDAR sensor(s) 664 or RADAR sensor(s) 660), among others.

The SoC(s) 604 may include data store(s) 616 (e.g., memory). The data store(s) 616 may be on-chip memory of the SoC(s) 604, which may store neural networks to be executed on the GPU and/or the DLA. In some examples, the data store(s) 616 may be large enough in capacity to store multiple instances of neural networks for redundancy and safety. The data store(s) 616 may comprise L2 or L3 cache(s) 612. Reference to the data store(s) 616 may include reference to the memory associated with the PVA, DLA, and/or other accelerator(s) 614, as described herein.

The SoC(s) 604 may include one or more processor(s) 610 (e.g., embedded processors). The processor(s) 610 may include a boot and power management processor that may be a dedicated processor and subsystem to handle boot power and management functions and related security enforcement. The boot and power management processor may be a part of the SoC(s) 604 boot sequence and may provide runtime power management services. The boot power and management processor may provide clock and voltage programming, assistance in system low power state transitions, management of SoC(s) 604 thermals and temperature sensors, and/or management of the SoC(s) 604 power states. Each temperature sensor may be implemented as a ring-oscillator whose output frequency is proportional to temperature, and the SoC(s) 604 may use the ring-oscillators to detect temperatures of the CPU(s) 606, GPU(s) 608, and/or accelerator(s) 614. If temperatures are determined to exceed a threshold, the boot and power management processor may enter a temperature fault routine and put the SoC(s) 604 into a lower power state and/or put the vehicle 600 into a chauffeur to safe stop mode (e.g., bring the vehicle 600 to a safe stop).

The processor(s) 610 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 610 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 610 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 610 may further include a real-time camera engine that may include a dedicated processor subsystem for handling real-time camera management.

The processor(s) 610 may further include a high-dynamic range signal processor that may include an image signal processor that is a hardware engine that is part of the camera processing pipeline.

The processor(s) 610 may include a video image compositor that may be a processing block (e.g., implemented on a microprocessor) that implements video post-processing functions needed by a video playback application to produce the final image for the player window. The video image compositor may perform lens distortion correction on wide-view camera(s) 670, surround camera(s) 674, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 608 is not required to continuously render new surfaces. Even when the GPU(s) 608 is powered on and active doing 3D rendering, the video image compositor may be used to offload the GPU(s) 608 to improve performance and responsiveness.

The SoC(s) 604 may further include a mobile industry processor interface (MIPI) camera serial interface for receiving video and input from cameras, a high-speed interface, and/or a video input block that may be used for camera and related pixel input functions. The SoC(s) 604 may further include an input/output controller(s) that may be controlled by software and may be used for receiving I/O signals that are uncommitted to a specific role.

The SoC(s) 604 may further include a broad range of peripheral interfaces to enable communication with peripherals, audio codecs, power management, and/or other devices. The SoC(s) 604 may be used to process data from cameras (e.g., connected over Gigabit Multimedia Serial Link and Ethernet), sensors (e.g., LIDAR sensor(s) 664, RADAR sensor(s) 660, etc. that may be connected over Ethernet), data from bus 602 (e.g., speed of vehicle 600, steering wheel position, etc.), data from GNSS sensor(s) 658 (e.g., connected over Ethernet or CAN bus). The SoC(s) 604 may further include dedicated high-performance mass storage controllers that may include their own DMA engines, and that may be used to free the CPU(s) 606 from routine data management tasks.

The SoC(s) 604 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 604 may be faster, more reliable, and even more energy-efficient and space-efficient than conventional systems. For example, the accelerator(s) 614, when combined with the CPU(s) 606, the GPU(s) 608, and the data store(s) 616, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 620) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 608.

In some examples, a CNN for facial recognition and vehicle owner identification may use data from camera sensors to identify the presence of an authorized driver and/or owner of the vehicle 600. The always on sensor processing engine may be used to unlock the vehicle when the owner approaches the driver door and turn on the lights, and, in security mode, to disable the vehicle when the owner leaves the vehicle. In this way, the SoC(s) 604 provide for security against theft and/or carjacking.

In another example, a CNN for emergency vehicle detection and identification may use data from microphones 696 to detect and identify emergency vehicle sirens. In contrast to conventional systems, that use general classifiers to detect sirens and manually extract features, the SoC(s) 604 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 658. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 662, until the emergency vehicle(s) passes.

The vehicle may include a CPU(s) 618 (e.g., discrete CPU(s), or dCPU(s)), that may be coupled to the SoC(s) 604 via a high-speed interconnect (e.g., PCIe). The CPU(s) 618 may include an X86 processor, for example. The CPU(s) 618 may be used to perform any of a variety of functions, including arbitrating potentially inconsistent results between ADAS sensors and the SoC(s) 604, and/or monitoring the status and health of the controller(s) 636 and/or infotainment SoC 630, for example.

The vehicle 600 may include a GPU(s) 620 (e.g., discrete GPU(s), or dGPU(s)), that may be coupled to the SoC(s) 604 via a high-speed interconnect (e.g., NVIDIA's NVLINK). The GPU(s) 620 may provide additional artificial intelligence functionality, such as by executing redundant and/or different neural networks, and may be used to train and/or update neural networks based on input (e.g., sensor data) from sensors of the vehicle 600.

The vehicle 600 may further include the network interface 624 which may include one or more wireless antennas 626 (e.g., one or more wireless antennas for different communication protocols, such as a cellular antenna, a Bluetooth antenna, etc.). The network interface 624 may be used to enable wireless connectivity over the Internet with the cloud (e.g., with the server(s) 678 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 600 information about vehicles in proximity to the vehicle 600 (e.g., vehicles in front of, on the side of, and/or behind the vehicle 600). This functionality may be part of a cooperative adaptive cruise control functionality of the vehicle 600.

The network interface 624 may include a SoC that provides modulation and demodulation functionality and enables the controller(s) 636 to communicate over wireless networks. The network interface 624 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 600 may further include data store(s) 628 which may include off-chip (e.g., off the SoC(s) 604) storage. The data store(s) 628 may include one or more storage elements including RAM, SRAM, DRAM, VRAM, Flash, hard disks, and/or other components and/or devices that may store at least one bit of data.

The vehicle 600 may further include GNSS sensor(s) 658. The GNSS sensor(s) 658 (e.g., GPS, assisted GPS sensors, differential GPS (DGPS) sensors, etc.), to assist in mapping, perception, occupancy grid generation, and/or path planning functions. Any number of GNSS sensor(s) 658 may be used, including, for example and without limitation, a GPS using a USB connector with an Ethernet to Serial (RS-232) bridge.

The vehicle 600 may further include RADAR sensor(s) 660. The RADAR sensor(s) 660 may be used by the vehicle 600 for long-range vehicle detection, even in darkness and/or severe weather conditions. RADAR functional safety levels may be ASIL B. The RADAR sensor(s) 660 may use the CAN and/or the bus 602 (e.g., to transmit data generated by the RADAR sensor(s) 660) for control and to access object tracking data, with access to Ethernet to access raw data in some examples. A wide variety of RADAR sensor types may be used. For example, and without limitation, the RADAR sensor(s) 660 may be suitable for front, rear, and side RADAR use. In some example, Pulse Doppler RADAR sensor(s) are used.

The RADAR sensor(s) 660 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 660 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 600 surroundings at higher speeds with minimal interference from traffic in adjacent lanes. The other two antennae may expand the field of view, making it possible to quickly detect vehicles entering or leaving the vehicle's 600 lane.

Mid-range RADAR systems may include, as an example, a range of up to 660 m (front) or 80 m (rear), and a field of view of up to 42 degrees (front) or 650 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 600 may further include ultrasonic sensor(s) 662. The ultrasonic sensor(s) 662, which may be positioned at the front, back, and/or the sides of the vehicle 600, may be used for park assist and/or to create and update an occupancy grid. A wide variety of ultrasonic sensor(s) 662 may be used, and different ultrasonic sensor(s) 662 may be used for different ranges of detection (e.g., 2.5 m, 4 m). The ultrasonic sensor(s) 662 may operate at functional safety levels of ASIL B.

The vehicle 600 may include LIDAR sensor(s) 664. The LIDAR sensor(s) 664 may be used for object and pedestrian detection, emergency braking, collision avoidance, and/or other functions. The LIDAR sensor(s) 664 may be functional safety level ASIL B. In some examples, the vehicle 600 may include multiple LIDAR sensors 664 (e.g., two, four, six, etc.) that may use Ethernet (e.g., to provide data to a Gigabit Ethernet switch).

In some examples, the LIDAR sensor(s) 664 may be capable of providing a list of objects and their distances for a 360-degree field of view. Commercially available LIDAR sensor(s) 664 may have an advertised range of approximately 600 m, with an accuracy of 2 cm-3 cm, and with support for a 600 Mbps Ethernet connection, for example. In some examples, one or more non-protruding LIDAR sensors 664 may be used. In such examples, the LIDAR sensor(s) 664 may be implemented as a small device that may be embedded into the front, rear, sides, and/or corners of the vehicle 600. The LIDAR sensor(s) 664, in such examples, may provide up to a 120-degree horizontal and 35-degree vertical field-of-view, with a 200 m range even for low-reflectivity objects. Front-mounted LIDAR sensor(s) 664 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 600. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 664 may be less susceptible to motion blur, vibration, and/or shock.

The vehicle may further include IMU sensor(s) 666. The IMU sensor(s) 666 may be located at a center of the rear axle of the vehicle 600, in some examples. The IMU sensor(s) 666 may include, for example and without limitation, an accelerometer(s), a magnetometer(s), a gyroscope(s), a magnetic compass(es), and/or other sensor types. In some examples, such as in six-axis applications, the IMU sensor(s) 666 may include accelerometers and gyroscopes, while in nine-axis applications, the IMU sensor(s) 666 may include accelerometers, gyroscopes, and magnetometers.

In some embodiments, the IMU sensor(s) 666 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 666 may enable the vehicle 600 to estimate heading without requiring input from a magnetic sensor by directly observing and correlating the changes in velocity from GPS to the IMU sensor(s) 666. In some examples, the IMU sensor(s) 666 and the GNSS sensor(s) 658 may be combined in a single integrated unit.

The vehicle may include microphone(s) 696 placed in and/or around the vehicle 600. The microphone(s) 696 may be used for emergency vehicle detection and identification, among other things.

The vehicle may further include any number of camera types, including stereo camera(s) 668, wide-view camera(s) 670, infrared camera(s) 672, surround camera(s) 674, long-range and/or mid-range camera(s) 698, and/or other camera types. The cameras may be used to capture image data around an entire periphery of the vehicle 600. The types of cameras used depends on the embodiments and requirements for the vehicle 600, and any combination of camera types may be used to provide the necessary coverage around the vehicle 600. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 6A and FIG. 6B.

The vehicle 600 may further include vibration sensor(s) 642. The vibration sensor(s) 642 may measure vibrations of components of the vehicle, such as the axle(s). For example, changes in vibrations may indicate a change in road surfaces. In another example, when two or more vibration sensors 642 are used, the differences between the vibrations may be used to determine friction or slippage of the road surface (e.g., when the difference in vibration is between a power-driven axle and a freely rotating axle).

The vehicle 600 may include an ADAS system 638. The ADAS system 638 may include a SoC, in some examples. The ADAS system 638 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 660, LIDAR sensor(s) 664, and/or a camera(s). The ACC systems may include longitudinal ACC and/or lateral ACC. Longitudinal ACC monitors and controls the distance to the vehicle immediately ahead of the vehicle 600 and automatically adjust the vehicle speed to maintain a safe distance from vehicles ahead. Lateral ACC performs distance keeping, and advises the vehicle 600 to change lanes when necessary. Lateral ACC is related to other ADAS applications such as LCA and CWS.

CACC uses information from other vehicles that may be received via the network interface 624 and/or the wireless antenna(s) 626 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 600), while the I2V communication concept provides information about traffic further ahead. CACC systems may include either or both I2V and V2V information sources. Given the information of the vehicles ahead of the vehicle 600, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 660, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 660, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 600 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 600 if the vehicle 600 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 660, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 600 is backing up. Some RCTW systems include AEB to ensure that the vehicle brakes are applied to avoid a crash. RCTW systems may use one or more rear-facing RADAR sensor(s) 660, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 600, the vehicle 600 itself must, in the case of conflicting results, decide whether to heed the result from a primary computer or a secondary computer (e.g., a first controller 636 or a second controller 636). For example, in some embodiments, the ADAS system 638 may be a backup and/or secondary computer for providing perception information to a backup computer rationality module. The backup computer rationality monitor may run a redundant diverse software on hardware components to detect faults in perception and dynamic driving tasks. Outputs from the ADAS system 638 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 604.

In other examples, ADAS system 638 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 638 may be fed into the primary computer's perception block and/or the primary computer's dynamic driving task block. For example, if the ADAS system 638 indicates a forward crash warning due to an object immediately ahead, the perception block may use this information when identifying objects. In other examples, the secondary computer may have its own neural network which is trained and thus reduces the risk of false positives, as described herein.

The vehicle 600 may further include the infotainment SoC 630 (e.g., an in-vehicle infotainment system (IVI)). Although illustrated and described as a SoC, the infotainment system may not be a SoC, and may include two or more discrete components. The infotainment SoC 630 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 600. For example, the infotainment SoC 630 may radios, disk players, navigation systems, video players, USB and Bluetooth connectivity, carputers, in-car entertainment, Wi-Fi, steering wheel audio controls, hands free voice control, a heads-up display (HUD), an HMI display 634, a telematics device, a control panel (e.g., for controlling and/or interacting with various components, features, and/or systems), and/or other components. The infotainment SoC 630 may further be used to provide information (e.g., visual and/or audible) to a user(s) of the vehicle, such as information from the ADAS system 638, autonomous driving information such as planned vehicle maneuvers, trajectories, surrounding environment information (e.g., intersection information, vehicle information, road information, etc.), and/or other information.

The infotainment SoC 630 may include GPU functionality. The infotainment SoC 630 may communicate over the bus 602 (e.g., CAN bus, Ethernet, etc.) with other devices, systems, and/or components of the vehicle 600. In some examples, the infotainment SoC 630 may be coupled to a supervisory MCU such that the GPU of the infotainment system may perform some self-driving functions in the event that the primary controller(s) 636 (e.g., the primary and/or backup computers of the vehicle 600) fail. In such an example, the infotainment SoC 630 may put the vehicle 600 into a chauffeur to safe stop mode, as described herein.

The vehicle 600 may further include an instrument cluster 632 (e.g., a digital dash, an electronic instrument cluster, a digital instrument panel, etc.). The instrument cluster 632 may include a controller and/or supercomputer (e.g., a discrete controller or supercomputer). The instrument cluster 632 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 630 and the instrument cluster 632. In other words, the instrument cluster 632 may be included as part of the infotainment SoC 630, or vice versa.

Figure 6D:
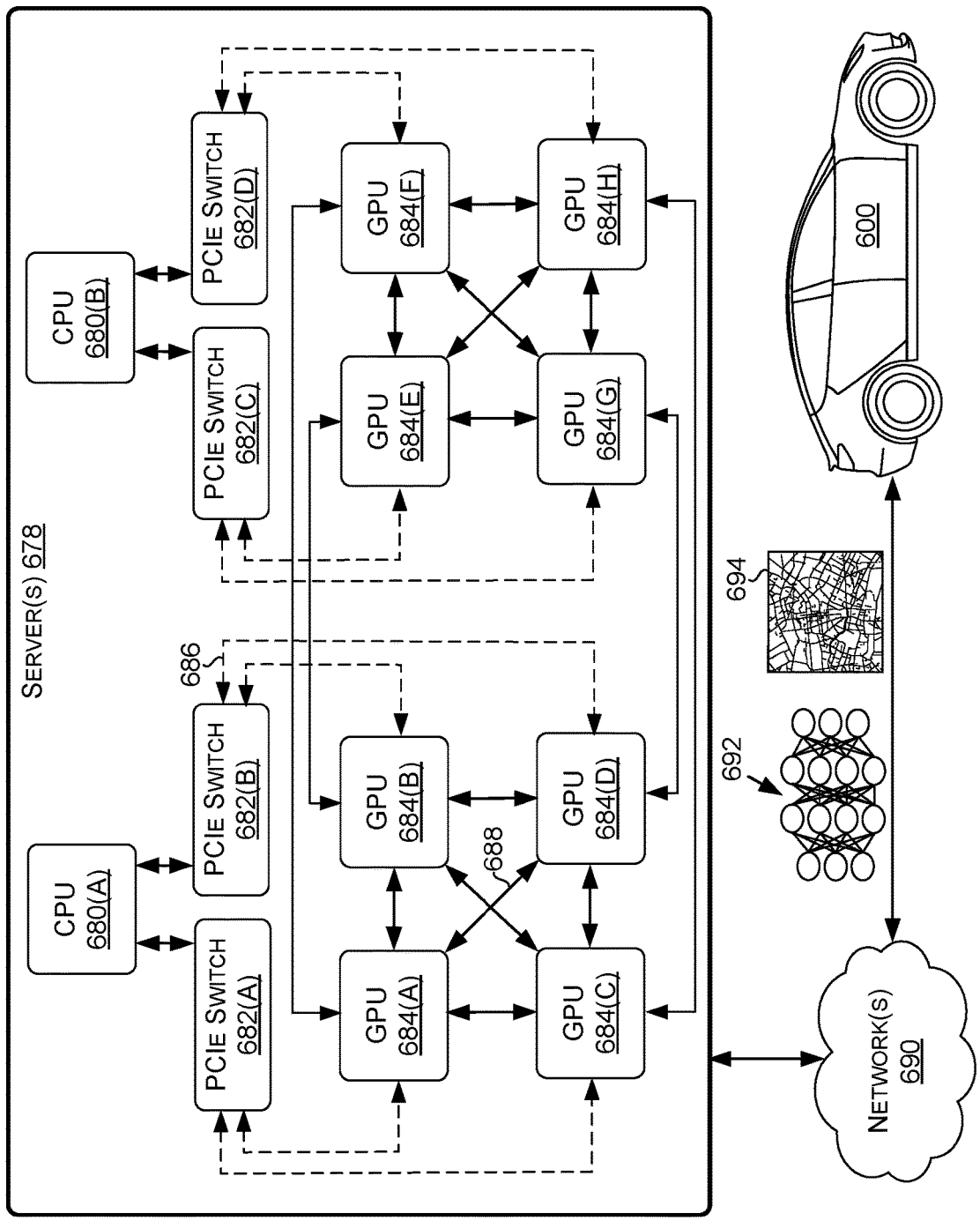
FIG. 6D is a system diagram for communication between cloud-based server(s) and the example autonomous vehicle of FIG. 6A, in accordance with some embodiments of the present disclosure.

FIG. 6D is a system diagram for communication between cloud-based server(s) and the example autonomous vehicle 600 of FIG. 6A, in accordance with some embodiments of the present disclosure. The system 676 may include server(s) 678, network(s) 690, and vehicles, including the vehicle 600. The server(s) 678 may include a plurality of GPUs 684(A)-684(H) (collectively referred to herein as GPUs 684), PCIe switches 682(A)-682(H) (collectively referred to herein as PCIe switches 682), and/or CPUs 680(A)-680(B) (collectively referred to herein as CPUs 680). The GPUs 684, the CPUs 680, and the PCIe switches may be interconnected with high-speed interconnects such as, for example and without limitation, NVLink interfaces 688 developed by NVIDIA and/or PCIe connections 686. In some examples, the GPUs 684 are connected via NVLink and/or NVSwitch SoC and the GPUs 684 and the PCIe switches 682 are connected via PCIe interconnects. Although eight GPUs 684, two CPUs 680, and two PCIe switches are illustrated, this is not intended to be limiting. Depending on the embodiment, each of the server(s) 678 may include any number of GPUs 684, CPUs 680, and/or PCIe switches. For example, the server(s) 678 may each include eight, sixteen, thirty-two, and/or more GPUs 684.

The server(s) 678 may receive, over the network(s) 690 and from the vehicles, image data representative of images showing unexpected or changed road conditions, such as recently commenced road-work. The server(s) 678 may transmit, over the network(s) 690 and to the vehicles, neural networks 692, updated neural networks 692, and/or map information 694, including information regarding traffic and road conditions. The updates to the map information 694 may include updates for the HD map 622, such as information regarding construction sites, potholes, detours, flooding, and/or other obstructions. In some examples, the neural networks 692, the updated neural networks 692, and/or the map information 694 may have resulted from new training and/or experiences represented in data received from any number of vehicles in the environment, and/or based on training performed at a datacenter (e.g., using the server(s) 678 and/or other servers).

The server(s) 678 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 690, and/or the machine learning models may be used by the server(s) 678 to remotely monitor the vehicles.

In some examples, the server(s) 678 may receive data from the vehicles and apply the data to up-to-date real-time neural networks for real-time intelligent inferencing. The server(s) 678 may include deep-learning supercomputers and/or dedicated AI computers powered by GPU(s) 684, such as a DGX and DGX Station machines developed by NVIDIA. However, in some examples, the server(s) 678 may include deep learning infrastructure that use only CPU-powered datacenters.

The deep-learning infrastructure of the server(s) 678 may be capable of fast, real-time inferencing, and may use that capability to evaluate and verify the health of the processors, software, and/or associated hardware in the vehicle 600. For example, the deep-learning infrastructure may receive periodic updates from the vehicle 600, such as a sequence of images and/or objects that the vehicle 600 has located in that sequence of images (e.g., via computer vision and/or other machine learning object classification techniques). The deep-learning infrastructure may run its own neural network to identify the objects and compare them with the objects identified by the vehicle 600 and, if the results do not match and the infrastructure concludes that the AI in the vehicle 600 is malfunctioning, the server(s) 678 may transmit a signal to the vehicle 600 instructing a fail-safe computer of the vehicle 600 to assume control, notify the passengers, and complete a safe parking maneuver.

For inferencing, the server(s) 678 may include the GPU(s) 684 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 7:
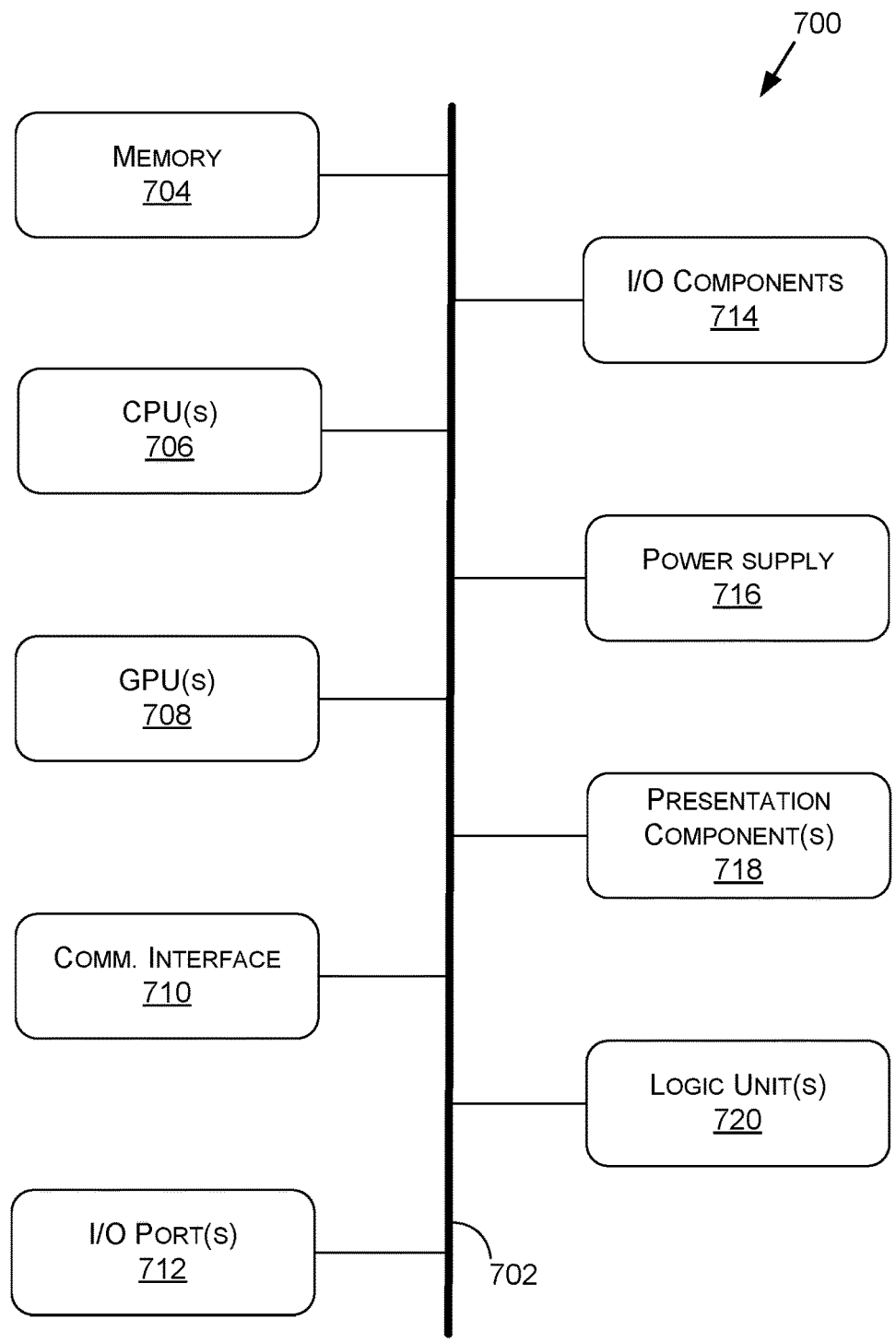
FIG. 7 is a block diagram of an example computing device suitable for use in implementing some embodiments of the present disclosure.

FIG. 7 is a block diagram of an example computing device(s) 700 suitable for use in implementing some embodiments of the present disclosure. Computing device 700 may include an interconnect system 702 that directly or indirectly couples the following devices: memory 704, one or more central processing units (CPUs) 706, one or more graphics processing units (GPUs) 708, a communication interface 710, input/output (I/O) ports 712, input/output components 714, a power supply 716, one or more presentation components 718 (e.g., display(s)), and one or more logic units 720. In at least one embodiment, the computing device(s) 700 may comprise one or more virtual machines (VMs), and/or any of the components thereof may comprise virtual components (e.g., virtual hardware components). For non-limiting examples, one or more of the GPUs 708 may comprise one or more vGPUs, one or more of the CPUs 706 may comprise one or more vCPUs, and/or one or more of the logic units 720 may comprise one or more virtual logic units. As such, a computing device(s) 700 may include discrete components (e.g., a full GPU dedicated to the computing device 700), virtual components (e.g., a portion of a GPU dedicated to the computing device 700), or a combination thereof.

Although the various blocks of FIG. 7 are shown as connected via the interconnect system 702 with lines, this is not intended to be limiting and is for clarity only. For example, in some embodiments, a presentation component

718, such as a display device, may be considered an I/O component 714 (e.g., if the display is a touch screen). As another example, the CPUs 706 and/or GPUs 708 may include memory (e.g., the memory 704 may be representative of a storage device in addition to the memory of the GPUs 708, the CPUs 706, and/or other components). In other words, the computing device of FIG. 7 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 7.

The interconnect system 702 may represent one or more links or busses, such as an address bus, a data bus, a control bus, or a combination thereof. The interconnect system 702 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 706 may be directly connected to the memory 704. Further, the CPU 706 may be directly connected to the GPU 708. Where there is direct, or point-to-point connection between components, the interconnect system 702 may include a PCIe link to carry out the connection. In these examples, a PCI bus need not be included in the computing device 700.

The memory 704 may include any of a variety of computer-readable media. The computer-readable media may be any available media that may be accessed by the computing device 700. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 704 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 700. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 706 may be configured to execute at least some of the computer-readable instructions to control one or more components of the computing device 700 to perform one or more of the methods and/or processes described herein. The CPU(s) 706 may each include one or more cores (e.g., one, two, four, eight, twenty-eight, seventy-two, etc.) that are capable of handling a multitude of software threads simultaneously. The CPU(s) 706 may include any type of processor, and may include different types of processors depending on the type of computing device 700 implemented (e.g., processors with fewer cores for mobile devices and processors with more cores for servers). For example, depending on the type of computing device 700, the processor may be an Advanced RISC Machines (ARM) processor implemented using Reduced Instruction Set Computing (RISC) or an x86 processor implemented using Complex Instruction Set Computing (CISC). The computing device 700 may include one or more CPUs 706 in addition to one or more microprocessors or supplementary co-processors, such as math co-processors. In some embodiments, one or more aspects of the mission controller 120 may be executed by the CPU(s) 706.

In addition to or alternatively from the CPU(s) 706, the GPU(s) 708 may be configured to execute at least some of the computer-readable instructions to control one or more components of the computing device 700 to perform one or more of the methods and/or processes described herein. One or more of the GPU(s) 708 may be an integrated GPU (e.g., with one or more of the CPU(s) 706 and/or one or more of the GPU(s) 708 may be a discrete GPU. In embodiments, one or more of the GPU(s) 708 may be a coprocessor of one or more of the CPU(s) 706. The GPU(s) 708 may be used by the computing device 700 to render graphics (e.g., 3D graphics) or perform general purpose computations. For example, the GPU(s) 708 may be used for General-Purpose computing on GPUs (GPGPU). The GPU(s) 708 may include hundreds or thousands of cores that are capable of handling hundreds or thousands of software threads simultaneously. The GPU(s) 708 may generate pixel data for output images in response to rendering commands (e.g., rendering commands from the CPU(s) 706 received via a host interface). The GPU(s) 708 may include graphics memory, such as display memory, for storing pixel data or any other suitable data, such as GPGPU data. The display memory may be included as part of the memory 704. The GPU(s) 708 may include two or more GPUs operating in parallel (e.g., via a link). The link may directly connect the GPUs (e.g., using NVLINK) or may connect the GPUs through a switch (e.g., using NVSwitch). When combined together, each GPU 708 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 706 and/or the GPU(s) 708, the logic unit(s) 720 may be configured to execute at least some of the computer-readable instructions to control one or more components of the computing device 700 to perform one or more of the methods and/or processes described herein. In embodiments, the CPU(s) 706, the GPU(s) 708, and/or the logic unit(s) 720 may discretely or jointly perform any combination of the methods, processes and/or portions thereof. One or more of the logic units 720 may be part of and/or integrated in one or more of the CPU(s) 706 and/or the GPU(s) 708 and/or one or more of the logic units 720 may be discrete components or otherwise external to the CPU(s) 706 and/or the GPU(s) 708. In embodiments, one or more of the logic units 720 may be a coprocessor of one or more of the CPU(s) 706 and/or one or more of the GPU(s) 708.

Examples of the logic unit(s) 720 include one or more processing cores and/or components thereof, such as Data Processing Units (DPUs), Tensor Cores (TCs), Tensor Processing Units(TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 710 may include one or more receivers, transmitters, and/or transceivers that enable the computing device 700 to communicate with other computing devices via an electronic communication network, included wired and/or wireless communications. The communication interface 710 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 720 and/or communication interface 710 may include one or more data processing units (DPUs) to transmit data received over a network and/or through interconnect system 702 directly to (e.g., a memory of) one or more GPU(s) 708.

The I/O ports 712 may enable the computing device 700 to be logically coupled to other devices including the I/O components 714, the presentation component(s) 718, and/or other components, some of which may be built in to (e.g., integrated in) the computing device 700. Illustrative I/O components 714 include a microphone, mouse, keyboard, joystick, game pad, game controller, satellite dish, scanner, printer, wireless device, etc. The I/O components 714 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 700. The computing device 700 may be include depth cameras, such as stereoscopic camera systems, infrared camera systems, RGB camera systems, touchscreen technology, and combinations of these, for gesture detection and recognition. Additionally, the computing device 700 may include accelerometers or gyroscopes (e.g., as part of an inertia measurement unit (IMU)) that enable detection of motion. In some examples, the output of the accelerometers or gyroscopes may be used by the computing device 700 to render immersive augmented reality or virtual reality.

The power supply 716 may include a hard-wired power supply, a battery power supply, or a combination thereof. The power supply 716 may provide power to the computing device 700 to enable the components of the computing device 700 to operate.

The presentation component(s) 718 may include a display (e.g., a monitor, a touch screen, a television screen, a heads-up-display (HUD), other display types, or a combination thereof), speakers, and/or other presentation components. The presentation component(s) 718 may receive data from other components (e.g., the GPU(s) 708, the CPU(s) 706, DPUs, etc.), and output the data (e.g., as an image, video, sound, etc.).

Example Data Center

Figure 8:
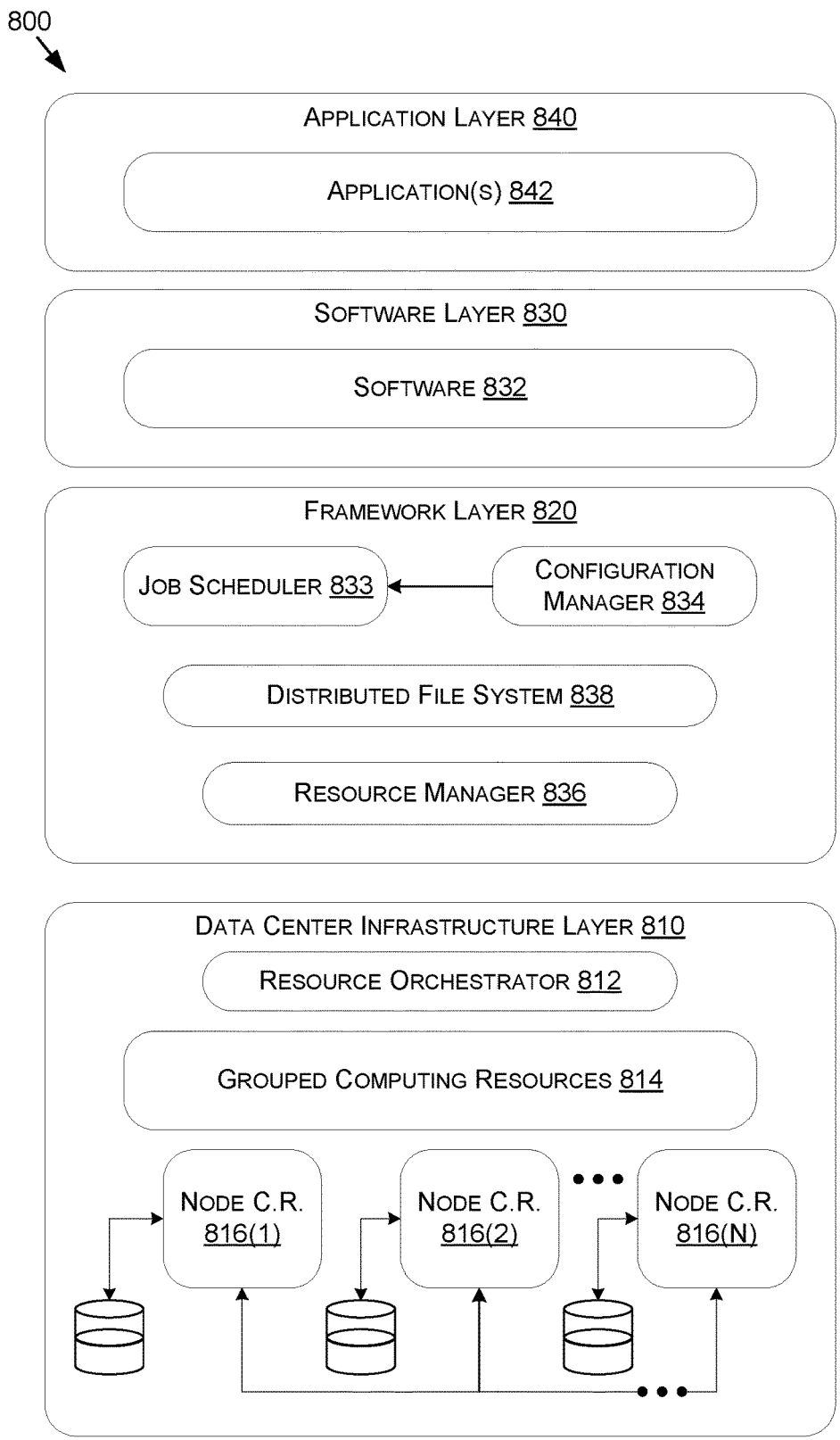
FIG. 8 is a block diagram of an example data center suitable for use in implementing some embodiments of the present disclosure.

FIG. 8 illustrates an example data center 800 that may be used in at least one embodiments of the present disclosure. The data center 800 may include a data center infrastructure layer 810, a framework layer 820, a software layer 830, and/or an application layer 840.

As shown in FIG. 8, the data center infrastructure layer 810 may include a resource orchestrator 812, grouped computing resources 814, and node computing resources ("node C.R.s") 816(1)-816(N), where "N" represents any whole, positive integer. In at least one embodiment, node C.R.s 816(1)-816(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 816(1)-816(N) may correspond to a server having one or more of the above-mentioned computing resources. In addition, in some embodiments, the node C.R.s 816(1)-8161(N) may include one or more virtual components, such as vGPUs, vCPUs, and/or the like, and/or one or more of the node C.R.s 816(1)-816(N) may correspond to a virtual machine (VM).

In at least one embodiment, grouped computing resources 814 may include separate groupings of node C.R.s 816 housed within one or more racks (not shown), or many racks housed in data centers at various geographical locations (also not shown). Separate groupings of node C.R.s 816 within grouped computing resources 814 may include grouped compute, network, memory or storage resources that may be configured or allocated to support one or more workloads. In at least one embodiment, several node C.R.s 816 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 812 may configure or otherwise control one or more node C.R.s 816(1)-816(N) and/or grouped computing resources 814. In at least one embodiment, resource orchestrator 812 may include a software design infrastructure (SDI) management entity for the data center 800. The resource orchestrator 812 may include hardware, software, or some combination thereof.

In at least one embodiment, as shown in FIG. 8, framework layer 820 may include a job scheduler 833, a configuration manager 834, a resource manager 836, and/or a distributed file system 838. The framework layer 820 may include a framework to support software 832 of software layer 830 and/or one or more application(s) 842 of application layer 840. The software 832 or application(s) 842 may respectively include web-based service software or applications, such as those provided by Amazon Web Services, Google Cloud and Microsoft Azure. The framework layer 820 may be, but is not limited to, a type of free and open-source software web application framework such as Apache Spark™ (hereinafter "Spark") that may utilize distributed file system 838 for large-scale data processing (e.g., "big data"). In at least one embodiment, job scheduler 833 may include a Spark driver to facilitate scheduling of workloads supported by various layers of data center 800. The configuration manager 834 may be capable of configuring different layers such as software layer 830 and framework layer 820 including Spark and distributed file system 838 for supporting large-scale data processing. The resource manager 836 may be capable of managing clustered or grouped computing resources mapped to or allocated for support of distributed file system 838 and job scheduler 833. In at least one embodiment, clustered or grouped computing resources may include grouped computing resource 814 at data center infrastructure layer 810. The resource manager 836 may coordinate with resource orchestrator 812 to manage these mapped or allocated computing resources.

In at least one embodiment, software 832 included in software layer 830 may include software used by at least portions of node C.R.s 816(1)-816(N), grouped computing resources 814, and/or distributed file system 838 of framework layer 820. One or more types of software may include, but are not limited to, Internet web page search software, e-mail virus scan software, database software, and streaming video content software.

In at least one embodiment, application(s) 842 included in application layer 840 may include one or more types of applications used by at least portions of node C.R.s 816(1)-816(N), grouped computing resources 814, and/or distributed file system 838 of framework layer 820. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments. In some embodiments, one or more aspects of the mission controller 120 may be implemented by the software 832 and/or application(s) 842.

In at least one embodiment, any of configuration manager 834, resource manager 836, and resource orchestrator 812 may implement any number and type of self-modifying actions based on any amount and type of data acquired in any technically feasible fashion. Self-modifying actions may relieve a data center operator of data center 800 from making possibly bad configuration decisions and possibly avoiding underutilized and/or poor performing portions of a data center.

The data center 800 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 800. In at least one embodiment, trained or deployed machine learning models corresponding to one or more neural networks may be used to infer or predict information using resources described above with respect to the data center 800 by using weight parameters calculated through one or more training techniques, such as but not limited to those described herein.

In at least one embodiment, the data center 800 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 700 of FIG. 7—e.g., each device may include similar components, features, and/or functionality of the computing device(s) 700. In addition, where backend devices (e.g., servers, NAS, etc.) are implemented, the backend devices may be included as part of a data center 800, an example of which is described in more detail herein with respect to FIG. 8.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 700 described herein with respect to FIG. 7. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A system comprising:
one or more processing units to:
receive a mission request indicating a primary task;
correlate the primary task with a baseline task sequence;
assemble a behavior model logic framework that defines a plurality of local tasks performed by a plurality of task agents based on the baseline task sequence, the plurality of local tasks comprising one or more pre-defined modular behavior models, the behavior model logic framework comprising a holistic representation of individual task agents of the plurality of task agents and their respective local tasks involved in completing the primary task;
augment the one or more pre-defined modular behavior models within the behavior model logic framework based at least on one or more task customization parameters; and
control an operation of at least one task agent of the plurality of task agents based at least on a distribution of one or more segments of the behavior model logic framework for at least one mobile autonomous machine agent of the plurality of task agents to execute one or more tasks of the plurality of local tasks.

2. The system of claim 1, wherein the one or more processing units are further to:
distribute a first segment of the one or more segments of the behavior model logic framework to a first mobile autonomous machine agent to execute a first set of the one or more tasks of the plurality of local tasks; and
distribute a second segment of the one or more segments of the behavior model logic framework to a second mobile autonomous machine agent to execute a second set of the one or more tasks of the plurality of local tasks.

3. The system of claim 1, wherein the one or more processing units are further to:
execute a proxy representation that simulates execution of a first behavior model of the one or more pre-defined modular behavior models to represent an estimated state of a first task agent of the plurality of task agents that does not receive the first behavior model.

4. The system of claim 3, wherein the one or more processing units are further to:
operate the first task agent based on the first behavior model using commands communicated to an application programming interface (API).

5. The system of claim 1, wherein the one or more processing units are further to:
transmit the one or more segments of the behavior model logic framework to a dispatch function to distribute the one or more segments of the behavior model logic framework for the at least one mobile autonomous machine agent, wherein the dispatch function communicates with the at least one mobile autonomous machine agent via a wireless communication link.

6. The system of claim 1, wherein the one or more processing units are further to:
augment the one or more pre-defined modular behavior models based on at least one navigation route for the at least one mobile autonomous machine agent derived based at least on the mission request.

7. The system of claim 1, wherein the one or more processing units are further to:
determine the one or more task customization parameters based at least on a facility map to augment the one or more pre-defined modular behavior models.

8. The system of claim 1, wherein the one or more segments of the behavior model logic framework comprises at least one modular behavior model that instructs the at least one mobile autonomous machine agent to synchronize an action with at least one other task agent of the plurality of task agents to execute the one or more tasks of the plurality of local tasks.

9. The system of claim 1, wherein at least a first behavior model of the one or more pre-defined modular behavior models comprises a behavior tree that includes logic to control switching between sequences of behaviors.

10. The system of claim 1, wherein the one or more processing units are further to:
assign an identifier to the behavior model logic framework; and
track a status of the plurality of task agents based at least on the identifier.

11. The system of claim 1, wherein the one or more processing units are further to:
update the behavior model logic framework based on feedback data from one or more of the plurality of task agents to generate an updated segment of the behavior model logic framework; and
distribute the updated segment of the behavior model logic framework for the at least one mobile autonomous machine agent of the plurality of task agents.

12. The system of claim 1, wherein the one or more processing units are comprised in at least one of:
a control system for an autonomous or semi-autonomous machine;
a perception system for an autonomous or semi-autonomous machine;
a system for performing simulation operations;
a system for performing digital twin operations;
a system for performing light transport simulation;
a system for performing collaborative content creation for three-dimensional assets;
a system for generating or presenting at least one of virtual reality content, augmented reality content, or mixed reality content;
a system for performing deep learning operations;
a system for performing real-time streaming;
a system implemented using an edge device;
a system implemented using a robot;
a system for performing conversational AI operations;
a system for generating synthetic data;
a system incorporating one or more virtual machines (VMs);
a system implemented at least partially in a data center;
a system for performing generative AI operations;
a system implemented at least partially using a language model; or
a system implemented at least partially using cloud computing resources.

13. A processor comprising:
one or more processing units to:
correlate a baseline task sequence with one or more pre-defined modular behavior models, the baseline task sequence derived from a mission request;
augment the one or more pre-defined modular behavior models based at least on one or more task customization parameters to generate one or more custom behavior models;
assemble a behavior model logic framework that defines a sequence of a plurality of local tasks performed by a plurality of task agents based on the baseline task sequence and the one or more custom behavior models, the behavior model logic framework comprising a holistic representation of individual task agents of the plurality of task agents and their respective local tasks involved in completing the primary task; and
operate at least one mobile autonomous machine agent of the plurality of task agents to perform at least one local task of the plurality of local tasks by distributing at least a segment of the behavior model logic framework to the at least one mobile autonomous machine agent.

14. The processor of claim 13, wherein the one or more processing units are further to:
execute a proxy representation that simulates execution of a first custom behavior model of the one or more custom behavior models to represent an estimated state of a first task agent of the plurality of task agents that does not receive the first custom behavior model.

15. The processor of claim 14, wherein the one or more processing units are further to:
operate the first task agent based on the first custom behavior model using commands communicated to an application programming interface (API).

16. The processor of claim 13, wherein the one or more processing units are further to:
compute at least one navigation route for the at least one mobile autonomous machine agent derived based at least on the mission request; and
augment the one or more pre-defined modular behavior models based on the at least one navigation route.

17. The processor of claim 13, wherein the segment of the behavior model logic framework comprises at least one modular behavior model that instructs the at least one mobile autonomous machine agent to synchronize an action with at least one other task agent of the plurality of task agents.

18. The processor of claim 13, wherein the one or more processing units are further to:
update the behavior model logic framework based on feedback data from one or more of the plurality of task agents to generate an updated segment of the behavior model logic framework; and
distribute the updated segment of the behavior model logic framework for the at least one mobile autonomous machine agent of the plurality of task agents to execute one or more tasks of the plurality of local tasks.

19. The processor of claim 13, wherein the one or more processing units are comprised in at least one of:
a control system for an autonomous or semi-autonomous machine;
a perception system for an autonomous or semi-autonomous machine;
a system for performing simulation operations;
a system for performing digital twin operations;
a system for performing light transport simulation;

a system for performing collaborative content creation for three-dimensional assets;
a system for generating or presenting at least one of virtual reality content, augmented reality content, or mixed reality content;
a system for performing deep learning operations;
a system for performing real-time streaming;
a system implemented using an edge device;
a system implemented using a robot;
a system for performing conversational AI operations;
a system for generating synthetic data;
a system incorporating one or more virtual machines (VMs);
a system implemented at least partially in a data center;
a system for performing generative AI operations;
a system implemented at least partially using a language model; or
a system implemented at least partially using cloud computing resources.

20. A method comprising:

assembling a sequence of behavior models to generate a behavior model logic framework that defines a sequence of a plurality of local tasks performed by a plurality of task agents, and controlling an operation of at least one mobile autonomous machine agent of the plurality of task agents by distributing at least a segment of the behavior model logic framework to the at least one mobile autonomous machine agent, the behavior model logic framework comprising a holistic representation of individual task agents of the plurality of task agents and their respective local tasks involved in completing the primary task.

* * * * *